(12) United States Patent
Bertram et al.

(10) Patent No.: US 11,805,105 B2
(45) Date of Patent: Oct. 31, 2023

(54) SYSTEM AND ASSOCIATED METHOD FOR ENSURING DATA PRIVACY

(71) Applicant: University of Cape Town, Cape Town (ZA)

(72) Inventors: Sabine Bertram, Cape Town (ZA); Pierre Georg Georg, Cape Town (ZA)

(73) Assignee: University of Cape Town, Cape Town (ZA)

(*) Notice: Subject to any disclaimer, the term of this patent is extended or adjusted under 35 U.S.C. 154(b) by 669 days.

(21) Appl. No.: 16/811,653

(22) Filed: Mar. 6, 2020

(65) Prior Publication Data
US 2020/0287874 A1 Sep. 10, 2020

(30) Foreign Application Priority Data
Mar. 8, 2019 (GB) ..................................... 1903141

(51) Int. Cl.
*H04L 29/06* (2006.01)
*H04L 9/40* (2022.01)
(Continued)

(52) U.S. Cl.
CPC ....... *H04L 63/0428* (2013.01); *G06Q 30/018* (2013.01); *G06Q 50/265* (2013.01);
(Continued)

(58) Field of Classification Search
CPC ... H04L 63/0428; H04L 9/0833; H04L 9/321; H04L 9/3234; G06Q 30/018; G06Q 50/265; G06Q 2220/18
(Continued)

(56) References Cited

U.S. PATENT DOCUMENTS 11,194,915 B2 * 12/2021 Stolfo .................. H04L 67/131
2003/0061487 A1 * 3/2003 Angelo ............... G06F 21/6209
713/176
(Continued)

OTHER PUBLICATIONS

Suthar, "ObfuCloud: An enhanced framework for securing DaaS services using data obfuscation mechanism in cloud environment", 2018, Springer, p. 333-343 (Year: 2018).*
(Continued)

*Primary Examiner* — Noura Zoubair
*Assistant Examiner* — Gregory A Lane
(74) *Attorney, Agent, or Firm* — Womble Bond Dickinson (US) LLP

(57) ABSTRACT

Systems and methods for ensuring data privacy in a data sharing system are provided. A computer implemented method carried out at a host computing system includes: accessing a set of data from a data source including a true element and at least one spurious element so that the host computing system cannot differentiate between the elements to obfuscate the true element from the host computing system. The method includes: accessing a code which is executable on the set of data so as to output multiple results for the elements of the set of data; processing the set of data, including for each element: executing the code on the element to generate a result; computing a hash value of the element; and outputting the result in association with the hash value to a third-party computing system. A third-party computing system has access to the true hash value of the true element for identification of the result generated by execution of the code on the true element.

14 Claims, 9 Drawing Sheets

(51) Int. Cl.
  *G06Q 30/018* (2023.01)
  *G06Q 50/26* (2012.01)
  *H04L 9/08* (2006.01)
  *H04L 9/32* (2006.01)
(52) U.S. Cl.
  CPC ............ *H04L 9/0833* (2013.01); *H04L 9/321* (2013.01); *H04L 9/3234* (2013.01); *G06Q 2220/18* (2013.01)
(58) Field of Classification Search
  USPC .......................................................... 726/27
  See application file for complete search history.

(56) References Cited

U.S. PATENT DOCUMENTS

| | | | | |
|---|---|---|---|---|
| 2009/0180698 | A1* | 7/2009 | Ramani | G06V 10/225 382/219 |
| 2010/0010967 | A1* | 1/2010 | Muller | G06F 16/28 707/E17.014 |
| 2013/0151861 | A1* | 6/2013 | Gan | G06F 21/125 713/189 |
| 2014/0325223 | A1* | 10/2014 | Turgeman | G06F 21/31 713/168 |
| 2015/0278549 | A1 | 10/2015 | Kolesnikov et al. | |
| 2016/0065370 | A1* | 3/2016 | Le Saint | H04L 9/14 713/155 |
| 2017/0091485 | A1* | 3/2017 | Yuen | H04L 9/002 |
| 2018/0239928 | A1* | 8/2018 | Kurian | G06F 21/6263 |
| 2019/0303579 | A1* | 10/2019 | Reddy | H04L 9/50 |
| 2019/0372765 | A1* | 12/2019 | Tegeder | H04L 9/0894 |
| 2022/0156757 | A1* | 5/2022 | Loyd | G06Q 30/0185 |

OTHER PUBLICATIONS

Wang, "Ensuring Data Storage Security in Cloud Computing", 2010, IEEE, pp. 1-9 (Year: 2010).*

Search Report & Written Opinion dated May 3, 2023, in related Singapore Application No. 11202109329W.

* cited by examiner

SYSTEM AND ASSOCIATED METHOD FOR ENSURING DATA PRIVACY

CROSS-REFERENCE(S) TO RELATED APPLICATIONS

This application claims priority from United Kingdom patent application number 1903141.8 filed on 8 Mar. 2019, which is incorporated by reference herein.

FIELD OF THE INVENTION

This invention relates to ensuring data privacy. In particular, this relates to ensuring data privacy whilst processing anonymized data in a data sharing system.

BACKGROUND TO THE INVENTION

With an increase in the use of digital devices and systems, information and data is more easily accessible to people all around the globe as individuals are required to submit personal information and data in order to register for and use services or perform transactions. The personal information may in some cases be information which the individuals deem sensitive such as medical information, banking details, identification numbers, or the like. Technological developments allow individuals to submit and share this personal information with other parties via online platforms.

Collecting large amounts of personal data is what allows companies to provide a range of convenient services free, or at extremely low cost to the user. From search engines, to social media platforms and most mobile apps, the collection of personal data has become ubiquitous. Many of these services are only possible because companies and organizations are allowed to combine vast amounts of personal data, analyse, and sell them to third parties. This poses a massive threat to users' privacy, as they cannot control how their personal information is used. Existing legal frameworks provide imperfect protection of data privacy.

With the advent of so-called "big data" and artificial intelligence, data has become a commodity in itself and companies are gathering data at phenomenal rates, sometimes by arguably unscrupulous means, in order to support their data-driven business models. There is therefore a constant struggle between data owners wanting to keep their personal data private and companies wanting to use that data for analytical and other purposes. Once a data owner has shared his or her personal data with a third-party, even if as part of a legitimate user agreement, the data owner effectively loses control over the data and often has no guarantees that the third-party with whom the data was shared will continue to uphold the privacy of the data.

Keeping personal information private is not trivial, even if an individual chooses not to upload or otherwise share it because of increasing threat of cybercrime. Furthermore, not sharing data at all is highly unlikely and almost impossible as people are regularly required to share personal information when performing transactions via networks and enrolling for services, or share their personal data as part of a legitimate user agreement. The growing concern of sharing private information creates a problem for various entities who operate via online networks. Hence, fundamental questions are raised, such as how individuals can protect their data, and therefore their privacy in the digital realm.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to an aspect of the present invention there is provided a computer-implemented method for processing anonymized data, carried out at a host computing system and comprising: accessing a set of data from a data source including a true element and at least one spurious element, wherein the host computing system cannot differentiate between the elements so as to obfuscate the true element from the host computing system, wherein a true hash value of the true element is provided to a third-party computing system; accessing a code which is executable on the set of data so as to output multiple results for the elements of the set of data; processing the set of data, including for each element: executing the code on the element to generate a result; computing a hash value of the element; and outputting the result in association with the hash value to the third-party computing system, wherein the third-party computing system has access to the true hash value of the true element for identification of the result generated by execution of the code on the true element.

Accessing the set of data may include accessing from each of multiple data sources a randomized dataset including a true element and at least one spurious element; and wherein the host computing system includes multiple host nodes each of which has access to all possible permutations of the randomized datasets and includes compressing the permutations across the host nodes. Each host node may process the set of data by executing a different version of the code. Compressing the permutations across the host nodes may reduce storage requirements of the set of data at the host computing system by applying a secure multiparty computation using secret shares from the multiple data sources.

Reducing storage requirements at the host system may include executing a number of identical protocol rounds including: creating a random ordering of at least two host computing devices with sufficient computing and storing capacity to determine a database host node and at least one aggregator host node; receiving privately at the database host node randomized datasets from a prime number of data sources; the database host node computing all possible permutations of elements in the received datasets and computing a hash of each permutation and privately sending a hash of a permutation to each data source; receiving at the aggregator host node a summed multiparty secret from each data source computed amongst the multiple data sources of a secrete of each data source in a finite field over the prime number of data sources together with a hash of the permutation of the data source; and the aggregator host node computing a sum of all the secret shares and storing the sum and the hash of the permutations and communicating a set of hashes of the permutations to the database host to implement a compression factor as a cut-off to reduce storage requirements for any prime number of data sources.

The method may include preventing collusion between the third-party computing system and the host computing system by means of a tumbling mechanism that obfuscates which host node has computed which result.

The method may include verifying a license between a data source and a third-party computing system to execute code on the set of data, wherein the data source records a hash of the code in a license associated with the data source, and wherein the code is previously agreed on code if a hash of the executed code, which is stored in a license associated with a code provider, matches the hash of the code stored in the license associated with the data source.

The method may include steps carried out at the third-party computing system including: receiving from the data source the true hash value of the true element; receiving from the host computing system the result of code executed on each of the elements of the set of data together with the hash value of each element; and identifying the result of the true element by matching the true hash value received from the data source to the hash value associated with results from the host computing system. The method carried out at the third-party computing system may include implementing a consensus protocol to verify that the host computing system has executed an agreed code by ensuring that a certain number of host nodes report a same hash of executed code. The method carried out at the third-party computing system may include providing access to a true hash value of the true element only where consent to run code on the dataset of the data source is agreed.

The method may also comprise steps carried out at a data source including: providing a randomized dataset including a true element and at least one spurious element, wherein the spurious element cannot be distinguished from the true element by a host computing system so as to obfuscate the true element from the host computing system; and providing a hash value of the true element to the third-party computing system for later identification of a processed result of the true element.

According to another aspect of the present invention there is provided a system for processing anonymized data comprising a host computing system including a processor and a memory configured to provide computer program instructions to the processor to execute functions of components: a data accessing component for accessing a set of data from a data source including a true element and at least one spurious element, wherein the host computing system cannot differentiate between the elements so as to obfuscate the true element from the host computing system, wherein a true hash value of the true element is provided to the third-party computing system; a code accessing component for accessing a code which is executable on the set of data so as to output multiple results for the elements of the set of data; a code executing component for processing the set of data, including for each element: executing the code on the element to generate a result; computing a hash value of the element; and outputting the result in association with the hash value to the third-party computing system, wherein the third-party computing system has access to the true hash value of the true element for identification of the result generated by execution of the code on the true element.

The data accessing component may access, from each of multiple data sources, a randomized dataset including a true element and at least one spurious element; and wherein the host computing system includes multiple host nodes each of which has access to all possible permutations of the randomized datasets and including a storage reduction component for compressing the permutations across the host nodes. The storage reduction component may reduce storage requirements of the set of data at the host computing system by applying a secure multiparty computation using secret shares from the multiple data sources.

The system may include a collusion prevention component for preventing collusion between the third-party computing system and the host computing system by means of a tumbling mechanism that obfuscates which host node has computed which result.

The system may include an access control component for verifying a license between a data source and a third-party computing system to execute code on the set of data, wherein the data source records a hash of the code in a license associated with the data source, and wherein the code is previously agreed on code if a hash of the executed code, which is stored in a license associated with a code provider, matches the hash of the code stored in the license associated with the data source.

The system may comprise a third-party computing system including a processor and a memory configured to provide computer program instructions to the processor to execute functions of components: a hash receiving component for receiving from a data source a true hash value of the true element; a result receiving component for receiving from a host computing system a result of code executed on each of the elements of the set of data together with a hash value of each element; and a result identifying component for identifying the result of the true element by matching the hash values received from the data source to the hash value associated with results from the host computing system. The third-party computing system may include a consensus protocol component for implementing a consensus protocol to verify that the host computing system has computed an agreed code by ensuring that a certain number of host nodes report a same hash of executed code.

The system may further comprise a data source including a processor and a memory configured to provide computer program instructions to the processor to execute functions of components: a dataset providing component for providing a randomized dataset including a true element and at least one spurious element, wherein the spurious element cannot be distinguished from the true element by the host computing system so as to obfuscate the true element from the host computing system; and a hash providing component for providing a hash value of the true element to the third-party computing system for later identification of a processed result of the true element.

According to another aspect of the present invention there is provided a computer-implemented method for processing anonymized data comprising, carried out at a host computing system and comprising: accessing a set of data set of data from multiple data sources each providing a randomized dataset including a true element and at least one spurious element, wherein the host computing system cannot differentiate between the elements so as to obfuscate the true element from the host computing system, wherein a hash value of the true element is provided to a third-party computing system; wherein the host computing system includes multiple host nodes each of which has access to all possible permutations of the randomized datasets and includes compressing the permutations across the host nodes, and each host node: accesses a code which is executable on the set of data so as to output multiple results for the elements of the set of data; processes the set of data, including for each element: executing the code on the element to generate a result; computing a hash value of the element; and outputting the result in association with the hash value to the third-party computing system, wherein the third-party computing system has access to the true hash value of the true element for identification of the result generated by execution of the code on the true element.

According to a further aspect of the present invention there is provided a computer program product for processing anonymized data, the computer program product comprising a computer-readable medium having stored computer-readable program code for performing the steps of: accessing a set of data from a data source including a true element and at least one spurious element, wherein the host computing system cannot differentiate between the elements so as to obfuscate the true element from the host computing system, wherein a true hash value of the true element is provided to a third-party computing system; accessing a code which is executable on the set of data so as to output multiple results for the elements of the set of data; processing the set of data, including for each element: executing the code on the element to generate a result; computing a hash value of the element; and outputting the result in association with the hash value to the third-party computing system, wherein the third-party computing system has access to the true hash value of the true element for identification of the result generated by execution of the code on the true element.

In accordance with an aspect of the disclosure there is provided a computer-implemented method comprising: checking consent from a data owner for execution of code, for outputting a result derived from data, on the data owner's data; requesting at least one host to execute the code on the data owner's data, the data being a set of data including a true element and at least one spurious element; receiving results of the code execution on the set of data from the at least one host, wherein the results include execution of code on the true element as well as the at least one spurious element of the set of data; identifying which results received from the at least one host were computed on the true element; and, outputting the results. This may be carried out at a data source computing system.

Further features provide for the set of data to include various true elements and spurious elements; and for receiving results of the code execution on the set of data to include results of the code execution on the set of data and a hash of each of the true elements and spurious elements. Further features provide for identifying which results received from the at least one host were computed on the true element to include the third-party comparing hashes of the results received from the at least one host with hashes of the set of data of the data owner; for the hashes of the set of data of the data owner to be the hashes of the true elements in the set of data; and for the data owner to provide access to the hashes to the third-party if consent for the execution of code on the data owner's data has been received. A further feature provides for outputting of the results to include displaying the results on a communication device associated with a third-party.

Even further features provide for checking consent from a data owner for execution of code for outputting a result derived from data on the data owner's data to include: requesting consent from a data owner for execution of code on the data owner's data; requesting consent from a data owner for execution of code on the data owner's data each time the execution of code is required; and receiving consent for the execution of code on the data owner's data. Even further features provide for receiving consent for the execution of code on the set of data to include recording a hash of the code in a smart contract on a blockchain; and for the smart contract to be associated with the data owner.

A preferred embodiment includes requesting at least three hosts to execute the code on the data owner's data, and receiving results of the code execution on the set of data from the at least three hosts. Still further features provide for the method to include verifying that the code executed by the at least three hosts are previously agreed on code by implementing a consensus protocol; and for the consensus protocol to be a Byzantine protocol. A further feature provides for the code to be previously agreed on code if a hash of the executed code matches the hash of the code stored in the smart contract associated with the data owner. An even further feature provides for the hash of the executed code to be stored in a smart contract associated with a code provider on the blockchain. A still further feature provides for the smart contracts to be managed by the blockchain. A yet further feature provides for the method to include preventing collusion between the third-party and the at least one host, preferably by means of a tumbling mechanism.

In accordance with a further aspect of the disclosure there is provided a computer-implemented method comprising: accessing a set of data including a true element and at least one spurious element so as to obfuscate the true element from a host, wherein the set of data is associated with a data owner; accessing code which is executable on the set of data so as to output a result derived from the set of data; executing the code on the set of data to generate the result; and, outputting the result derived from executing the code on the set of data, the result including results derived from the true element and the at least one spurious element. This method may be carried out at a host computing system. A further feature provides for outputting the result derived from executing the code on the set of data to include transmitting the result to a third-party.

Further features provide for the method to include: receiving a data access consent notification; for at least one host to, in response to receiving the data access consent notification, generate a public-private key pair; make a public key associated with the host available to the data owner; receiving an encrypted set of data from the data owner, the encrypted set of data being the set of data having been encrypted by the data owner with the public key. Further features provide for receiving the encrypted set of data to include the at least one host decrypting the encrypted set of data; for the set of data to be decrypted with a private key associated with the at least one host; and for the set of data on which the code is executed to be the decrypted set of data. Even further features provide for the code to be registered in a code repository; for a hash of the code to be added to a smart contract on a blockchain; and for the smart contract to be associated with a code provider. Still further features provide for the data access consent notification to be received if the data owner accepts a consent request from a third-party to execute code on the data owner's set of data; and for accepting the request to include the data owner recording a hash of the code in a smart contract associated with the data owner. Further features provide for executing the code on the set of data to include determining if the code has been previously agreed on; and, if the code has been previously agreed on, executing the code on the set of data. Even further features provide for determining if the code has been previously agreed on to include comparing the hash of the code in the smart contract associated with the code provider with the hash of the code in the smart contract associated with the data owner; and, if the hashes match, agreeing that the code may be executed on the set of data. An even further feature provides for the method to include preventing collusion between the third-party and the host, preferably by means of a tumbling mechanism.

In accordance with a further aspect of the disclosure there is provided a data source computing system comprising: a processor and a memory configured to provide computer program instruction to the processor to execute functions of components; a consent checking component arranged to check consent from a data owner for execution of code, for outputting a result derived from data, on a data owner's data; a code execution requesting component arranged to request at least one host to execute the code on the data owner's data, the data owner's data being a set of data including at least one true element and at least one spurious element; a result receiving component arranged to receive results of the code execution on the data owner's data from the at least one host, wherein the results include execution of code on the at least one true element as well as the at least one spurious element of the set of data; a result identifying component arranged to identify which results received from the at least one host were computed on the at least one true element; and, a result outputting component arranged to output the results. In a preferred embodiment, the code execution component may be arranged to request at least three hosts to execute the code on the data owner's data, and the result receiving component may be arranged to receive results of the code execution on the data owner's data from the at least three hosts.

A further feature provides for the system to include one or more host devices, each comprising: a processor and a memory configured to provide computer program instruction to the processor to execute functions of components; a data accessing component arranged to access the set of data including the at least one true element and at least one spurious element so as to obfuscate the true element from a host; a code accessing component arranged to access the code which is executable on the set of data so as to output a result derived from the set of data; a code executing component arranged to execute the code on the set of data to generate the result; and, a result outputting component arranged to output the result derived from executing the code on the set of data, the result including results derived from the at least one true element and the at least one spurious element. A further feature provides for the system to include at least three host devices. A still further feature provides for the system to include a space reducing component for reducing storage requirements in the system.

In accordance with a further aspect of the invention there is provided a computer program product comprising a computer-readable medium having stored computer-readable program code for performing the steps of any of the aspects of the invention.

Embodiments of the invention will now be described, by way of examples only, with reference to the accompanying drawings.

DETAILED DESCRIPTION WITH REFERENCE TO THE DRAWINGS

Figure 1A:
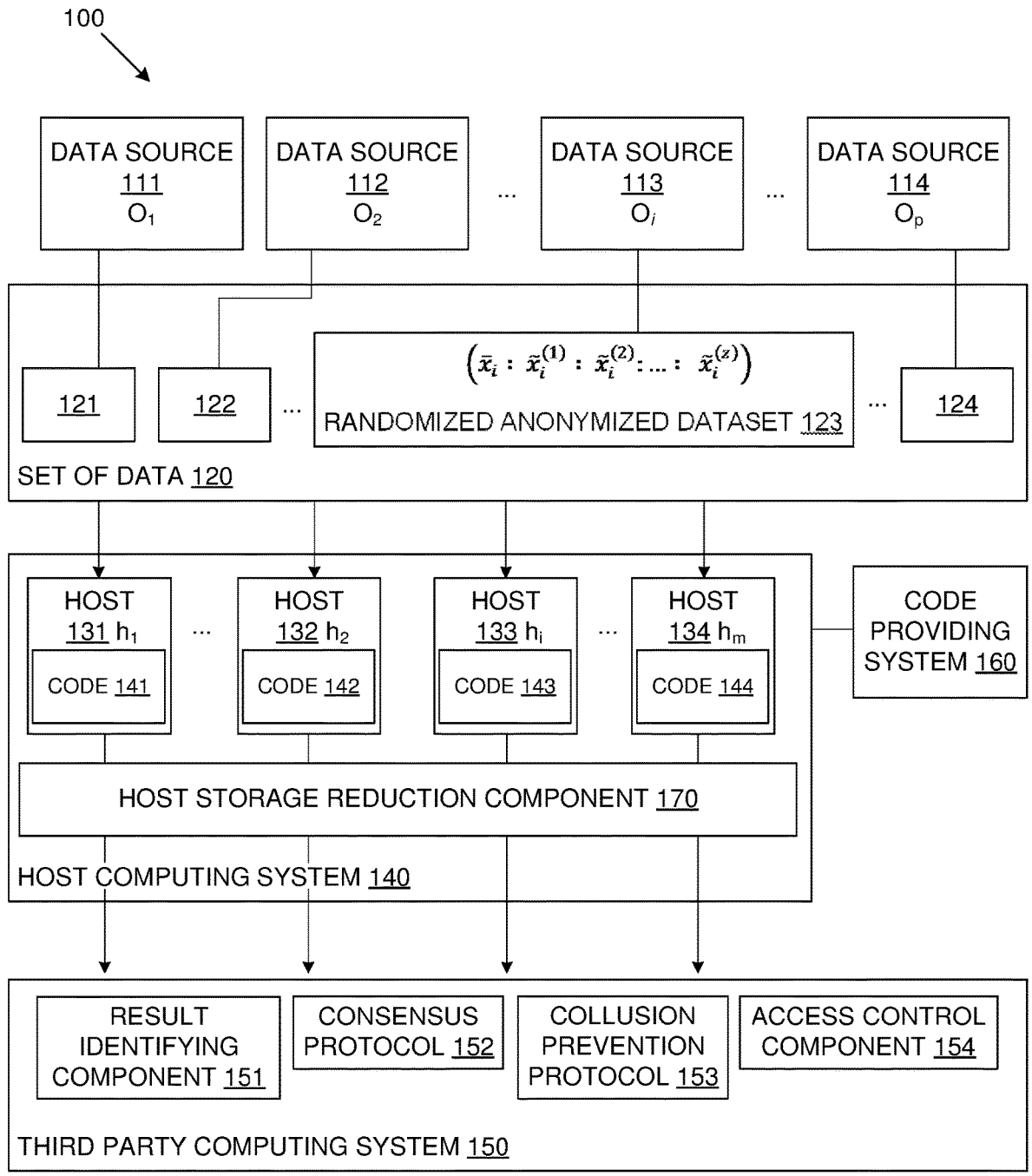
FIGS. 1A and 1B are schematic diagrams illustrating an exemplary embodiment of a system for protecting data privacy in a data sharing system according to aspects of the present disclosure.

Aspects of the present disclosure provide a system and method in which anonymized data from one or more data sources may be processed by a host computing system to run code provided from a code repository. The system described herein may be implemented using a combination of dedicated hosts to store data and execute the code. The results of the processed data are provided to a third-party computing device where results generated from true data elements within the anonymized data may be identified. The anonymized data is formed of true data elements and spurious data elements, where the spurious data elements are indistinguishable from the true data elements by the host computing system. Due to the anonymized data including true data elements obfuscated by one or more spurious elements, the amount of data being processed may be very large, and aspects of the disclosure optionally provide a storage reduction method and system at the host computing system. The host computing system may include multiple host nodes as described further below to provide a decentralized system. The host nodes may be independent host processing components across multiple computing devices or parallel processing methods within a computing host system run on a single computing device. Various security aspects are also described to ensure that there is no collusion between the host computing system and the third-party system. The system and method combine private data from one or more data sources in an efficient way to enable computation over joint private data. The described system and method reduce the computing time and memory requirements otherwise necessary to achieve the same functionality.

Code may be defined as non-separable if it cannot be implemented in an embarrassingly parallel fashion. Such code needs aggregated data provided in a joint database for execution of the code to obtain results. Centralized data storage attracts attackers causing data breaches. Therefore, a decentralized execution of code on data from data sources is described for execution of non-separable code on a joint dataset.

Further aspects of the disclosure may provide a system of data ownership in which data owners of data sources may allow code to be executed on their data, whilst keeping the data secure. The third-party may be any person or entity wishing to execute code on data of the data owner and is only able to run ex-ante (previously) agreed upon code on the data of the data owners. A blockchain running on a peer-to-peer network may be configured such that it allows data owners to create a smart contract that manages access to their private data and code providers to create a smart contract that manages use of their code. This repository may also interface with a (public) blockchain to store the hash of the source code. The data owners may further be allowed to delegate a decision as to who may have access to the data using the blockchain and to verify that only code which has been previously agreed upon is executed on the data owner's private data.

In what follows, the term "spurious" when used in relation to a data element, should be broadly construed to include any element of data which is artificially generated, chosen or otherwise selected to be combined in a set with at least one associated true data element, and which is indistinguishable from the true data element to anyone but the data owner. Spurious data elements therefore act as decoys to obstruct the identities of true data elements within sets of data. The true data elements and the spurious data elements may be indistinguishable to any entity other than the data source.

FIG. 1A is a schematic diagram which illustrates an exemplary embodiment of a system for protecting data in an anonymized data sharing system (100) according to aspects of the present disclosure. The system includes one or more data sources (111-114) of data owners, a host computing system (140) formed of one or more host nodes (131-134), a code providing system (160) and a third-party computing system (150). Each of the above-mentioned entities may execute on a computing system or device, such as a server, a desktop computer, a mobile phone, a laptop, or the like, and is in communication with the other entities via a communication network. In this implementation, the entities are arranged to provide a distributed system that provides data owners with a way to grant access to private data and revoke it at will. The data sources (111-114), the host operating system (140) and multiple host nodes within the system, the code providing system (160), and the third-party computing system (150) may all have identifying unique addresses.

FIG. 1A shows p data sources (111-114), denoted $o_1; \ldots; o_p$. A data source (113) owned by a data owner may have private data $x_i$ and allows a host computing system (140) to execute some code from a code providing system (160) on the data, obtaining a result $f(x_i)$. Third parties may be code creators themselves, offering their services to customers on whose behalf they run the code on a host. However, third parties must not be hosts to ensure the anonymity and security of the private data.

Each data source (111-114) may provide a dataset (121-124) in the form of a randomized dataset of a true element ($\bar{x}_i$) and at least one spurious element ($\tilde{x}_i^{(z)}$, where z is the number of spurious elements in the dataset. Data sources $o_1; \ldots; o_p$ (111-114) generate z versions of their private data each and share it with the host computing system 140. This yields total data: $(\bar{x}_1:\tilde{x}_1^{(1)}: \ldots :\tilde{x}_z^{(z)})$ for data owner $o_i$. The notation (:) indicates that the tuples are randomized at the data source before they are sent to the host computing system (140).

The host computing system (140) receiving the datasets (121-124) cannot differentiate between the elements so that the true element is obfuscated from the host computing system (140) anonymizing the data. This masks which entry in the tuple is the private data and masks the data owner's private information for the host. In practice, z will be smaller for less sensitive data. Note that in many instances z can be relatively small. For example, if the data contains private information about the value of an asset with a market price of P, two values, P and (P+ΔP) are stored.

The host computing system (140) receives a set of data (120) of all the permutations of the datasets (121-124) from the data sources (111-114), which forms a joint dataset of the host computing system (140). This is denoted as:

$$\Omega = (\bar{x}_1:\tilde{x}_1^{(1)}: \ldots :\tilde{x}_1^{(z)}) \# \ldots \# (\bar{x}_p:\tilde{x}_p^{(1)}: \ldots :\tilde{x}_p^{(z)})$$

where # denotes all possible permutations of the (z+1) tuples. The datasets include elements that are true and at least one spurious element where the spurious element may be a first entry, second entry, etc. Since there may be more than one spurious element, all possible combinations of the true and spurious elements are considered and referred to as permutations. A permutation may be considered to be a random ordering of the set.

The host computing system (140) executes code from a code providing system (160) on behalf of a third-party. The third-party computing system (150) may specify which code it wants to run by having this code registered in a repository code providing system (160). The host computing system (140) may be implemented as a single node; however, additional functionality may be provided by it being implemented as multiple host nodes (131-134). In order to execute non-separable code on the joint dataset, the set of data (120) is accessed by each host node for execution of code on the set of data (120). Each host node (131-134) may run a possibly different version of the code. In one embodiment, at least three host nodes are required in order to provide a fault tolerance protocol in the form of a consensus protocol.

In order to execute non-separable code, the private data is stored in a joint database where each host node (131-134) has a complete copy of the entire database. The hosting is not shared across different nodes. However, physical storage of the data is not required, so this may be more generally referred to as a joint dataset. The host computing system (140) may include M host nodes $h_i; \ldots; h_M$, (131-134) with each host node m running a possibly different version of the code $f_m$ (141-144). A host node evaluates code on each permutation $\omega \in \Omega$ and then communicates a result to the third-party at the end of the process.

For X [MB] of true data for each of the p data sources, each host node may store $X \times (z+1)^p$ [MB] of joint data. The space requirements of the system are substantial and therefore a host storage reduction component (170) may be provided using multiparty storage reduction described further below.

The third-party computing system (150) includes a result identifying component (151) that uses a hash of the true data elements supplied by the data sources (111-114) to identify results of the processed true data elements. A hash value or hash is determined by a hash function applied to data elements to verify or identify the true data elements in the anonymized datasets. However, it should be understood that other forms of verification of the true data elements may be used and the term "hash value" should be interpreted to include other form of verification such as checksums, fingerprints, etc.

The third-party computing system (150) may include a consensus protocol (152) to apply a consensus mechanism to report to the third-party the addresses of host nodes that have consistent outcomes of the code execution. The third-party computing system (150) may include a collusion prevention component (153) to prevent collusion between the third-party computing system (150) and the host computing system (140) by obfuscating which host node has computed which result; the third-party does not need to know the identity of the host. The third-party computing system (150) may also include an access control component (154) to ensure that the host computing system (140) has executed the agreed-upon code as agreed by the data sources (111-114).

Figure 1B:
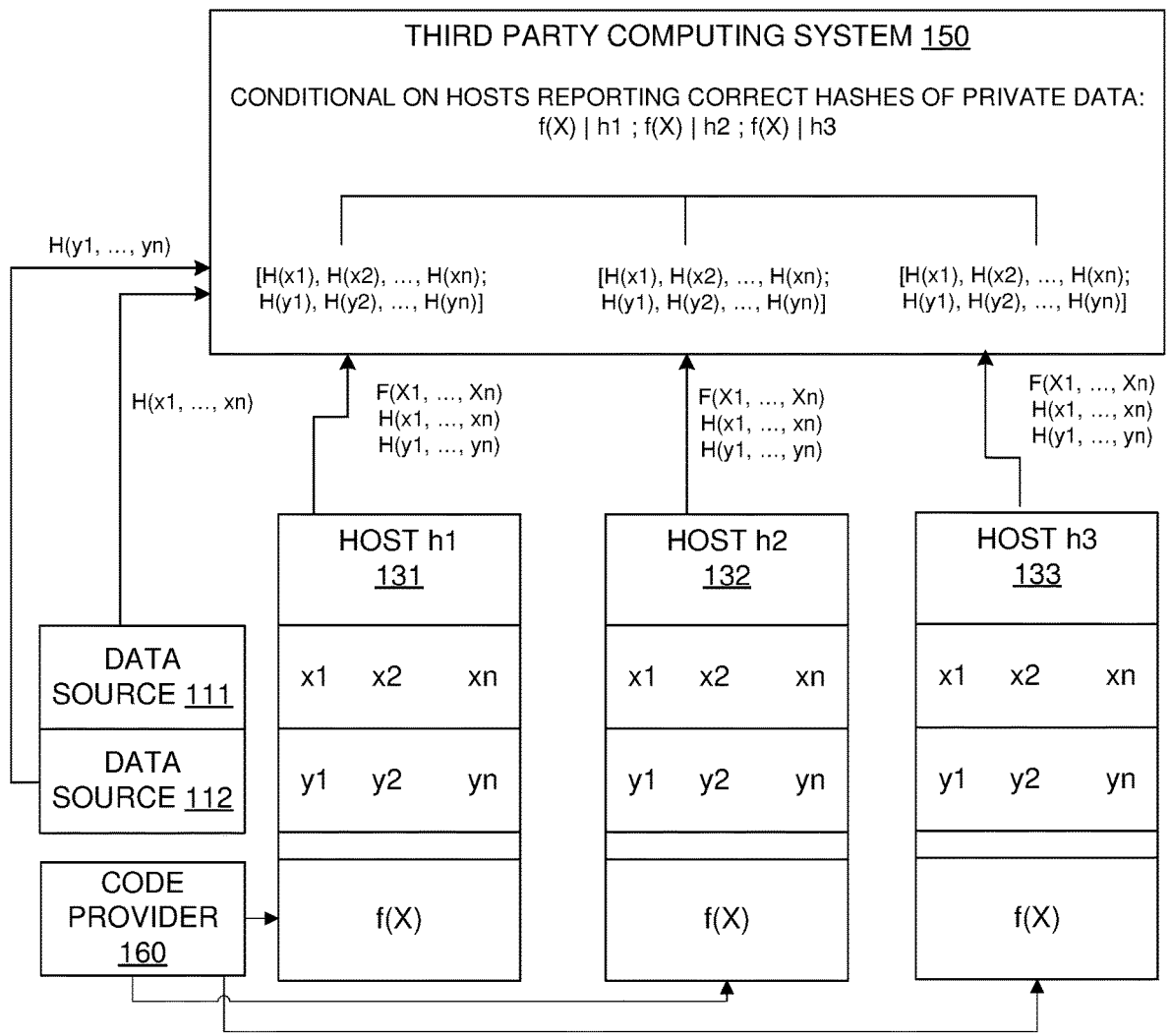

Referring to FIG. 1B, further interaction between the described entities is illustrated. A hash function H can be applied on data of arbitrary length to produce data of fixed length. The data sources (111-112) provide hash values of their data to the third-party computing system (150). The host nodes (131-133) of the host computing system (140) return two things to the third-party computing system (150): the return of the code execution on a permutation co, and the hash of each $x_i^{(k)} \in \omega$ (where k=1; ... ; p). Since hashes are cheap to compute, and can be stored pre-computed, this does not add substantially to the host's computing requirements. Formally, each host node $h_m$ returns a tuple to the third-party computing system (150):

$$\{f_m(\omega) \forall \omega \in \Omega; H(x_i^{(k)}) \forall x_i^{(k)} \in \omega \text{ and } \forall \omega \in \Omega\}$$

The third-party computing system (150) compares the hashes it receives from the host nodes (131-133) with the hashes it receives from the data sources (111-112). The third-party computing system (150) has various answers it can choose from, but not the private data. The host computing system (140) has the private data, but does not know which it is within the obfuscated data. The third-party computing system (150) identifies which of the answers reported by the hosts has been computed on the true joint data and which was computed on decoy or spurious data using the hashes of all private data provided by the data sources.

Each entity node of the system (100) may be associated with a unique address by way of which messages to the node are addressable. Each node address may for example be in the form of an Internet Protocol address or any other suitable form of address. Each node's address may be unique to that node, such that no other node on the system (100) has the same address. The node address may thus also act as a node identifier in that the node can be uniquely identified by way of its associated node address. Aspects of the present disclosure anticipate different types of nodes. Normal nodes may be lightweight in terms of resource requirements and may, for example, be provided by a software application configured for download onto and execution by a computing device, such as a mobile phone (smart phone, tablet computer, feature phone, wearable computing device, IoT device, etc.). In some implementations, the system may include one or more high performance nodes. High performance nodes may be high performance as compared to normal nodes, and may for example be provided by desktop, laptop or server computers with better (higher speed and/or bandwidth) internet connections. High performance nodes may designate themselves as such and may be volunteer nodes with more computing resources and better data connectivity as compared to normal nodes.

The system (100) may include any number of data sources, hosts, code providers and third parties. In an exemplary implementation at least three multiple host nodes may be used with a consensus protocol to determine truthful code execution by the hosts.

Figure 2A:
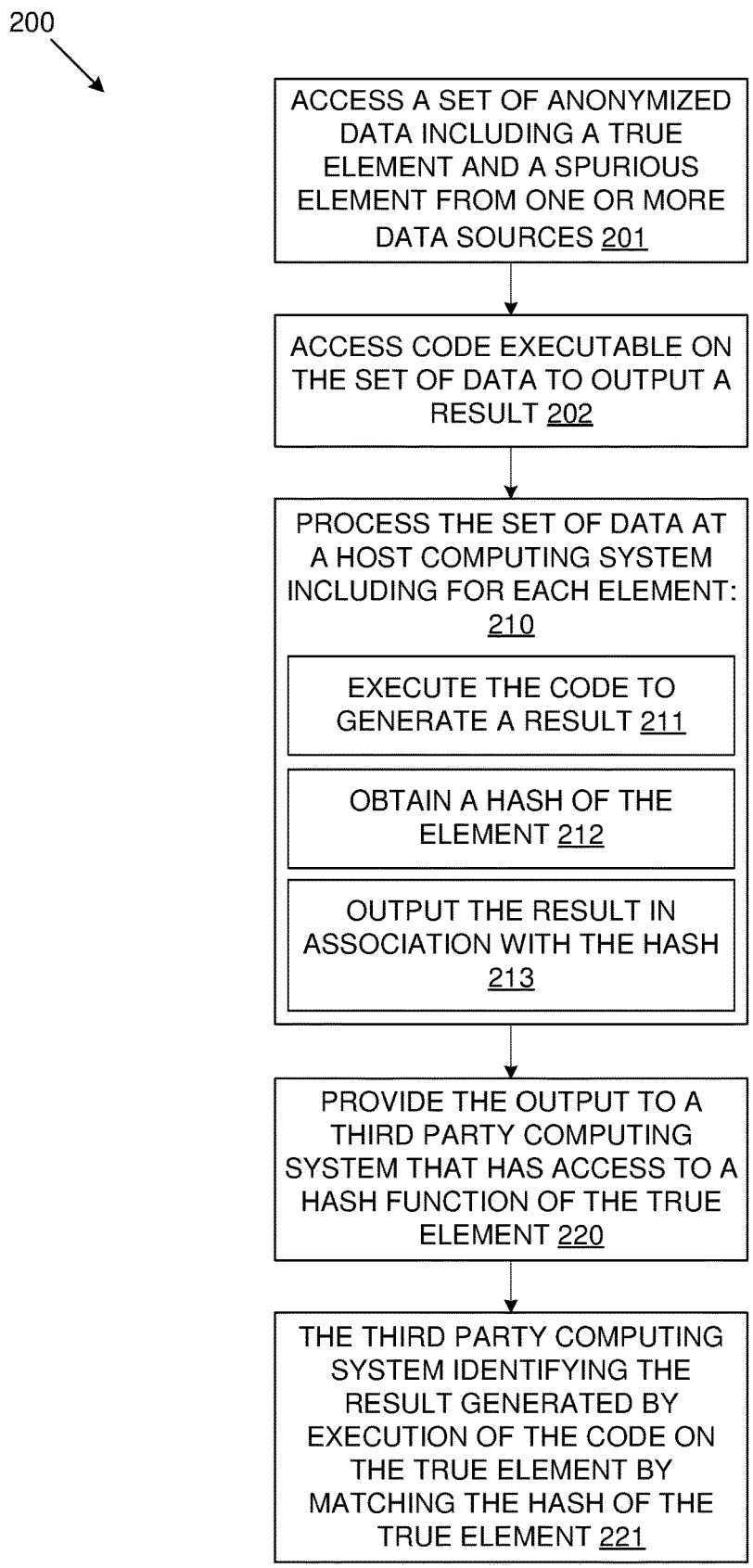
FIGS. 2A and 2B are flow diagrams which illustrate exemplary embodiments of a method according to aspects of the present disclosure.

Referring to FIG. 2A, a flow diagram (200) shows an example embodiment of the described method carried out at a host computing system (140). The method includes accessing (201) a set of anonymized data from one or more data sources including a true element and at least one spurious element. This may include accessing from each of multiple data sources a randomized dataset including a true element and at least one spurious element. The host computing system (140) may have one or more host nodes each of which has access to all possible permutations of the randomized datasets.

The method may access (202) a code which is executable on the set of data so as to output multiple results for the elements of the set of data. This includes processing (210) each data element in the dataset (including true elements and spurious elements) to: execute (211) the code on the element to generate a result; obtain or compute (212) a hash value of the element; and output (213) the result in association with the hash value to the third-party computing system. The output of the processing (210) is provided (220) to the third-party computing system, which has access to the true hash value of the true element provided from the data source. The true hash value is used for identification (221) of the result generated by execution of the code on the true element by matching the hash values for the true data elements. The verification method used to identify the true data elements may vary and the term hash value is used broadly to encompass values that may be obtained from the true data elements that may be compared for matching.

Figure 2B:
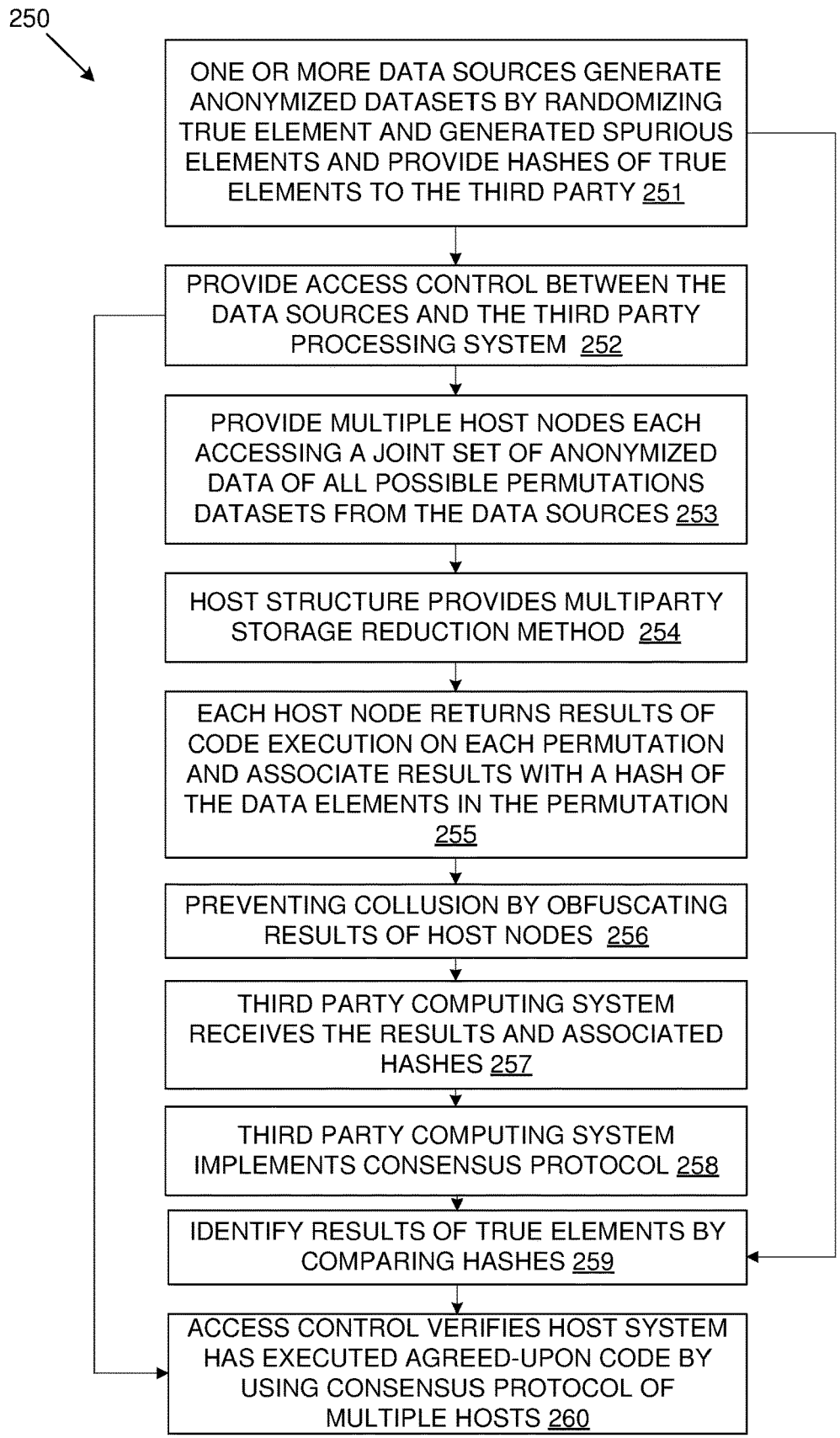

Referring to FIG. 2B, a flow diagram (250) shows a further example embodiment of the described method carried out at the various entities of the described system. Some of the method aspects may be used independently of the other described method aspects. Multiple data sources (111-114) generate (251) randomized datasets including a true element and at least one spurious element so as to obfuscate the true element from the host computing system (140). Each data source (111-114) may provide datasets including a large number of true elements each obfuscated by multiple spurious elements. The data sources (111-114) provide a true hash value of each of the true elements to a third-party computing system (150) for later identification of a processed result of the true elements.

The multiple data sources (111-114) may provide (252) access control between the data sources and the third-party computing system (150) including specifying an agreed-upon code for execution on the datasets of the data sources. This may be implemented by a license, for example, implemented by a blockchain as described with reference to FIGS. 5 and 6.

A host computing system (140) having multiple host nodes has access to (253) or stores a set of data in the form of a joint dataset of all the possible permutations of the datasets from the data sources (111-114) so that the host computing system (140) can execute non-separable code. Each host node (131-133) processes the set of data by executing a version of the code.

The host computing system (140) may provide (254) a compression of the permutations across host nodes (131-133) as a storage reduction method. The compression may reduce the number of permutations that are stored by the host computing system (140). This may reduce the storage requirements of the set of data at the host computing system (140) using the multiple host nodes by applying a secure multiparty computation using secret shares from the multiple data sources as described further below with reference to FIGS. 3 and 4. The storage reduction method may be used independently of the other aspects of the described method and system, for example, with other methods of verification of true data elements within anonymized datasets.

The host computing system (140) may return (255) results of the code execution by the multiple host nodes on each permutation of the datasets with the results associated with a hash value of the data elements of the permutation to a third-party computing system (150). This may include preventing collusion (256) between the third-party computing system (150) and the host computing system (140) by means of a tumbling mechanism that obfuscates which host node has computed which result.

The third-party computing system (150) receives (257) the results and associated hash values from the host computing system (140). The third-party computing system (150) may also implement (258) a consensus protocol to coordinate on a majority response. This may verify that the host computing system has computed an agreed code by ensuring that a certain number of the host nodes report a same hash of executed code. The third-party computing system (150) compares the hashes to the true hash values received from the data sources thereby identifying (259) the results of the true data values.

A data access control may be provided (260) by a license, such as a smart contract, between a data source and a third-party computing system to execute code on the set of data, wherein the data source records a hash of the code in a smart contract associated with the data source, and wherein the code is previously agreed on code if a hash of the executed code, which is stored in a smart contract associated with a code provider, matches the hash of the code stored in the smart contract associated with the data source. This may also involve only providing access to the true hash value of the true element only where consent to run code on the dataset of the data source is agreed.

The third-party computing system (150) may verify that the hosts have generated the results by only executing previously agreed on code on the set of data. At this stage a consensus protocol may be implemented on a blockchain. Implementing the consensus protocol may involve a smart contract of the third-party receiving all possible output results by all the hosts and applying the consensus protocol. In response to applying the consensus protocol, the smart contract reports addresses of the hosts who have reported consistent outcomes of the code execution on the data. A practical Byzantine fault tolerant (PBFT) protocol is executed to reach consensus. This algorithm may be less computationally intensive compared to others, and may be performed without requiring specialized hardware and may have low execution costs. The PBFT consensus algorithm may function in multiple phases to reach an agreement. It will be appreciated by those skilled in the art that in circumstances where a PBFT protocol is utilised, the system may be required to have at least three different hosts executing the code on the data owner's data.

Each third-party and host may be uniquely identified by means of a unique address, either of a wallet, or of a smart contract, or any other practical identifier. In an exemplary embodiment data owners may be identified through a unique smart contract which they may access via, for example, a self-sovereign identity system or directly through a web provider. The smart contract may be configured to maintain a list of addresses that have access to the data of the data owner. If the data owner wants to revoke the third-party's access to the set of data, the data owner may remove the address of the relevant third-party from the list of addresses that provides access to the set of data. The code verifies on the blockchain whether a data owner has granted access to their set of data. This may, for example, be done by verifying that a given address is in the list of addresses maintained by the smart contract. Hosts may be rewarded or paid for executing code only if their reported answers equal the answers the third-party selects based on the consensus protocol. This may align the incentives of hosts to execute code truthfully.

Third-party access to the data owner's data may be controlled by implementing one or more consent checks in the agreed executable code. These consent checks may include, amongst others, that the data owner has consented that agreed upon code is run on the data owner's data, and that the data owner has provided consent to the specific third-party concerned to run the agreed upon code on the data. It should be appreciated that security of data ownership may be strengthened by allocating a reward to the host, responsive to the host executing a predefined instruction. The host may therefore not be rewarded for executing code other that the previously agreed upon code on the private data.

It should further be appreciated that the previously agreed upon code may be non-separable code. In order to execute non-separable code on the sets of data associated with multiple data sources, the sets of data need to be stored in a joint database. Each host, responsible for storing the sets of data of data sources, may therefore need a complete copy of the entire joint database and the hosting may not be shared across different hosts. It should, however, be emphasized that the code may be separable or non-separable. The implementation of the methods and systems disclosed is not limited to either.

The system may ensure the validity of each host and prevent malicious parties acting as hosts to copy or intercept the data source's data, by obfuscating the data by using large amounts of spurious elements in the set of data. Each data source may therefore generate a variety of spurious versions of the true elements in the set of data, which the data source wishes to protect, and transmit the set of data to each of the hosts. The set of data may be encrypted and decrypted using a public-private key pair as described above. None of the hosts are, however, informed which versions of the data are the true elements and which are the spurious elements.

In order to prevent collusion between the third parties and the hosts, a tumbling mechanism or mixing service, such as the orchid protocol, that may obfuscate which host has output which result may be used. This may improve the anonymity of the hosts which participate in the blockchain and thereby preserve the integrity of the system. Such a tumbling mechanism is described in more detail below.

The system as described above may facilitate a strong notion of data ownership through the combination of commitment to ex-ante agreed upon code and a blockchain as a trustless and secure system for managing access control. An advantage of such a system may be that the blockchain can be used to facilitate payments between the third parties, data sources, code providers, and hosts.

The system may require significant storage space due to its design. For example, for X [MB] of true data of p data sources having z spurious or "decoy" versions of their data, each host may be required to store $X \times (z+1)^p$ MB of joint data. Even in a scenario in which z=1, the smallest possible number of copies, the storage requirement may be substantial with an increase in data sources.

Figure 3:
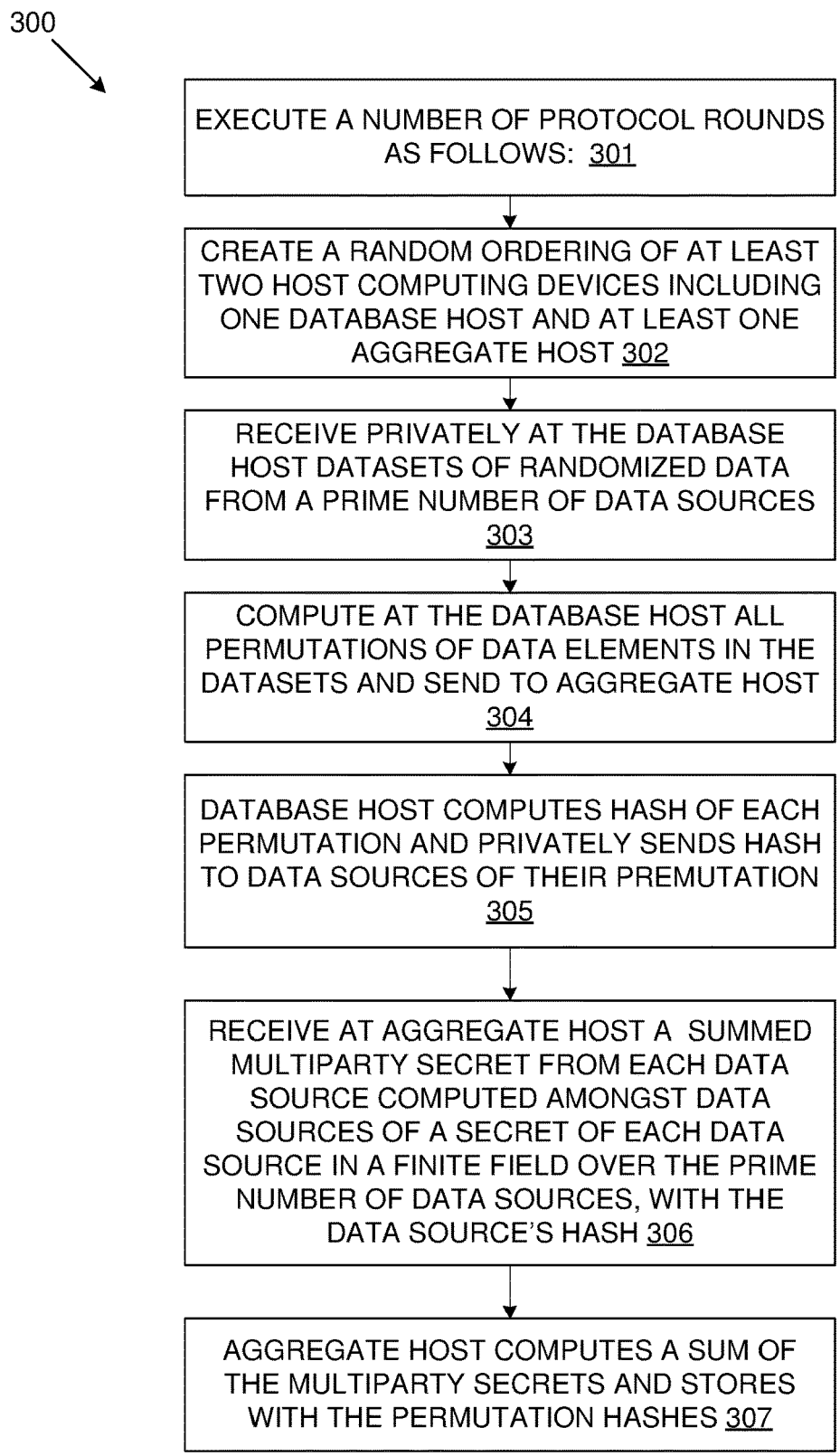
FIG. 3 is flow diagram which illustrates an exemplary embodiment of a space reducing method according to aspects of the present disclosure.

Referring to FIG. 3, a flow diagram (300) shows an example embodiment of a method of reducing storage requirements at the host computing system. The method compresses permutations across the host nodes of a host computing system by applying a secure multiparty computation using secret shares from the multiple data sources. This may include a communication protocol that allows multiple data sources to coordinate the inclusion of the true and spurious data.

The method executes (301) a number of identical protocol rounds. Each round including the following processing. The method includes creating (302) a random ordering of at least two host node computing devices with sufficient computing and storing capacity to determine a database host node and at least one aggregator host node.

The method includes receiving (303) privately at the database host node randomized datasets from a prime number of data sources. The database host node computes (304) all possible permutations of elements in the received datasets and sends this to the aggregate host and computes (305) a hash of each permutation and privately sends a hash of a permutation to each data source.

The method receives (306) at the aggregate host node a summed multiparty secret from each data source computed amongst the multiple data sources of a secrete of each data source in a finite field over the prime number of data sources together with a hash of the permutation of the data source and the aggregator host computes (307) and stores a sum of all the secret shares and stores the sum and the hash of the permutations and communicates a set of hashes of the permutations to the database host to implement a compression factor as a cut-off to reduce storage requirements for any prime number of data sources.

Figure 4:
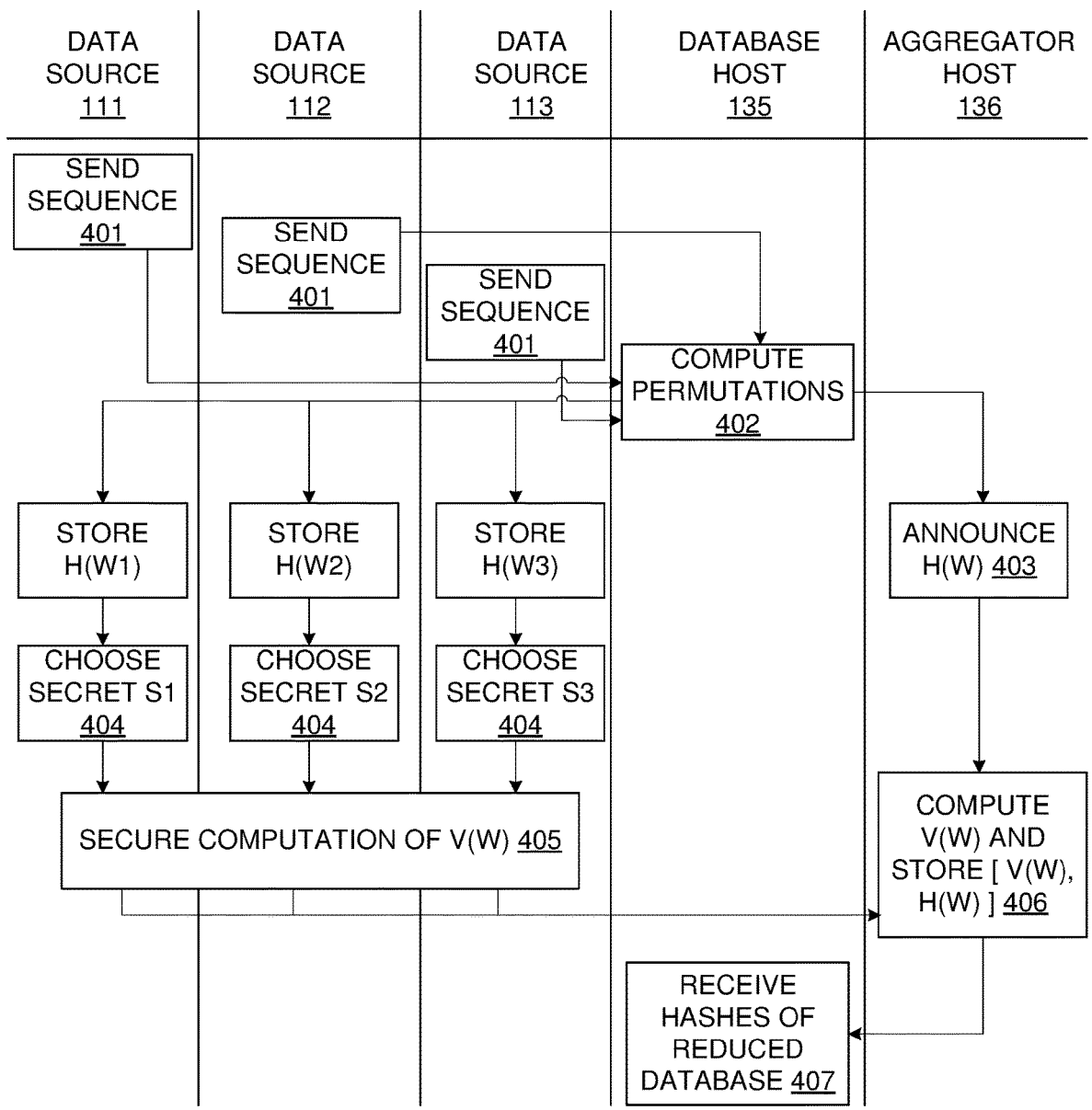
FIG. 4 is a swim-lane diagram which illustrates an exemplary embodiment of a space reducing component according to aspects of the present disclosure.

In order to alleviate some of the storage requirement concerns, the system may include a space reducing component configured to reduce the storage requirements. FIG. 4 illustrates an exemplary embodiment of a space reducing component. In an exemplary embodiment the space reducing component may include p data sources, where p is a prime number and be configured to execute a number of identical protocol rounds. Each protocol round may be divided into five steps. The space reducing component may further include participation of at least M>>2 hosts with sufficient computing and storing capacity to execute the five steps of each round.

A round may start with creating a random ordering of hosts. An exemplary method in which the random ordering of host may be performed is by allowing each host to choose a random number ($r_h$) and announce the number. Each data source also chooses a random number ($R_i$) and announces it. Then, for each host, $R_{hi}=H(r_h+R_i)$ is computed for all data sources. Hosts are ranked from lowest to highest $\Sigma_i$ R_hi. The first host according to this random ordering is designated the database host (135), while the other hosts are designated first aggregator (136), second aggregator, and so on.

In a further step each data source ($o_i$), where i=1, ..., p, privately sends (401) a sequence ($\underline{x}_i:\tilde{x}_i^{(1)}: \ldots :\tilde{x}_i^{(z)}$) to the database host, with (:) indicating that the sequence is sent in random order. One entry in the sequence being the true data element ($\underline{x}_i$) and the other entries spurious data elements. For example, for z=1, each data source may send (401) the true data element ($\bar{x}_i$) and a piece of spurious data ($\tilde{x}_i$) to the database host. The database host is unaware which of the first or second element is the true data element, as only the relevant data source may be able to distinguish between the true and the spurious data elements. At this point the database host computes (402) all possible combinations of elements in the sequences received:

$$\Omega=(\underline{x}_1:\tilde{x}_1^{(1)}: \ldots :\tilde{x}_1^{(z)})\# \ldots \# (\underline{x}_p:\tilde{x}_p^{(1)}: \ldots :\tilde{x}_p^{(z)})$$

where # denotes the concatenation of all possible permutations. The database host therefore has $(z+1)^p$ of X [MB] of data.

In a next step the database host computes H($\omega$) for each $\omega \in \Omega$, and iterates over the $\omega$ in the order of their hash. The database host publicly announces (403) H($\omega$) and privately sends $\omega_i$ to the i-th data source ($o_i$), for all i=1, ..., p.

Once contacted by the database host, each data source ($o_i$) choses (404) a secret ($S_i \in \mathbb{Z}/p\mathbb{Z}$), i.e. an element of the finite field constructed as the integers modulo p. Crucially, the secret is chosen in a finite field over the prime p (which equals the number of data sources in the protocol) according to:

$$s_i(\omega_i) = \begin{cases} k_i p + 1 & \text{if } \omega_i = \underline{x}_i \\ k_i p & \text{else} \end{cases}$$

where $k_i \in N$ is a privately chosen integer. The secret $s_i$ is a straightforward encoding of the true data element. An adversary knowing both $\omega_i$ and $s_i$ would be able to say whether $\omega_i$ is the true or the spurious data elements. Therefore, data source i will not want to share $s_i$ with the aggregator. In such an implementation the sum of all secrets $\Sigma_{i=1}^{P} s_i$ may be less sensitive to share. This sum may be computed (405) among the data sources only, using secure multiparty computation. This sum may be denoted as $v(\omega)=\Sigma_i s_i(\omega_i)$.

One of three possibilities obtains. First, $\omega_i=\underline{x}_i$ for some, but not all of the i. Then, p>v($\omega$)>0. Second, $\omega_i \neq \underline{x}_i \forall i$ (all data are spurious data elements). Then, trivially, v($\omega$)=0. And third, if $\omega_i=\underline{x}_i \forall i$ (all data are true data elements), then:

$$v(\omega) = \sum_{i=1}^{p} s_i = (k_1 p + 1) + \cdots + (k_p p + 1)$$
$$= (\underbrace{k_1 + \cdots + k_p}_{\equiv K})p + (\underbrace{1 + \cdots + 1}_{p \text{ times}})$$
$$= (K+1)p = 0$$

Each data source then communicates the secret shares obtained in the secure addition protocol together with H($\omega$) to the aggregator.

The aggregator takes all secret shares, computes (406) the sum v($\omega$) and stores (v($\omega$), H($\omega$)) privately. Once the aggregator has computed the sums for each $\omega \in \Omega$, the aggregator communicates a set $\Pi$ of hashes H($\omega$) to the database host, where $|\Pi|=v|\Omega|$, $v \leq 1$. A compression factor (v) may be implemented as a cut-off on v($\omega$). For example, given H($\omega$)$\in \Pi$ if v($\omega$)=0, then the aggregator includes only two combinations of private data, the combination with all true data and the combination with all spurious, or decoy, data. In this exemplary case, v=1−[(p−2)/p] and since $|\Omega|$=p then $|\Pi|$=2.

With the protocol outlined above the storage requirements for any prime number of data sources and any size of decoy data to X×2 [MB] may be substantially reduced. One advantage of the protocol is that the space requirements for the hosts may be adjusted depending on the privacy needs of the data sources. It is advisable to have $|\Pi|>>p$ to provide a reasonable level of privacy and protect data sources against malicious data sources colluding with the database host, thereby revealing which co contains true data elements.

As previously mentioned, collusion should be prevented between malicious hosts and third parties. A further example of collusion may be where a malicious host poses as a third-party, in such a scenario the malicious host may obtain the set of data, including the true data elements and spurious data elements, from the data source in its role as host, and the hashes of the true elements in its role as third-party. Such collusion may be prevented by implementing a secret sharing mechanism. An example of how the secret sharing mechanism may be implemented is provided below.

The secret sharing mechanism may be configured to make use of a set of designated hosts, also known as tumblers. Each tumbler may receive a secret ($y_i$) from a data source (i) once a third-party transmits a query for code execution to the system.

The data source may communicate the hash of the true data element augmented with all secrets to the third-party.

The augmentation may be determined by adding each secret ($y_k$) to the true data element ($x_k$) and hashing the addition. The hash returned to the third-party may therefore be:

$$H(x_i + y_i^1 + \ldots + y_i^s) = H(H(H(x_i) + y_i^1) \ldots + y_i^s)$$

It may be assumed that the secrets are numbered in the order in which they are added to the true data element by the data source. Since the data source may be aware of the contents of the secrets and the order in which they were added, the data source may communicate each secret to a designated host together with an address of the next host in the network. In this embodiment only the data source knows the ordering of the tumbler hosts. The tumbler host themselves only know who is next in line.

Once a computation enquiry is received by the hosts, the hosts may have to perform two tasks: i) they should output the result of the code execution to the third-party; and ii) instead of outputting the hashes of each $\underline{x}_i$ to the third-party, each party may look up who a first host in the tumbling process is and transmit the hashes of the set of data (including the true data elements $\underline{x}_i$ and decoy data elements $\tilde{x}_i^{(l)}$, l=1, . . . x) to the first tumbler, i.e. the first host in the tumbling process. The tumbler may obtain $H(\underline{x}_k)$ and use the secret ($y_k^1$) to compute $H(H(\underline{x}_k) + y_k^1)$ which may then be communicated to a second tumbler, where k∈{1, . . . p}. This process may be continued until the last tumbler is able to compute the hash that matches the hash that was output to the third-party by the data source.

The process may require that all hosts involved in the tumbling process are honest hosts. This may ensure that the probability of collusion is proportional to $$\frac{1}{M^s},$$

which decreases with an increase of the number of total hosts, M, and the number of hosts, s, involved in the tumbling process.

It should be appreciated that the storage reducing protocol may not necessarily have to be implemented for the practical implementation of the disclosed system.

Figure 5:
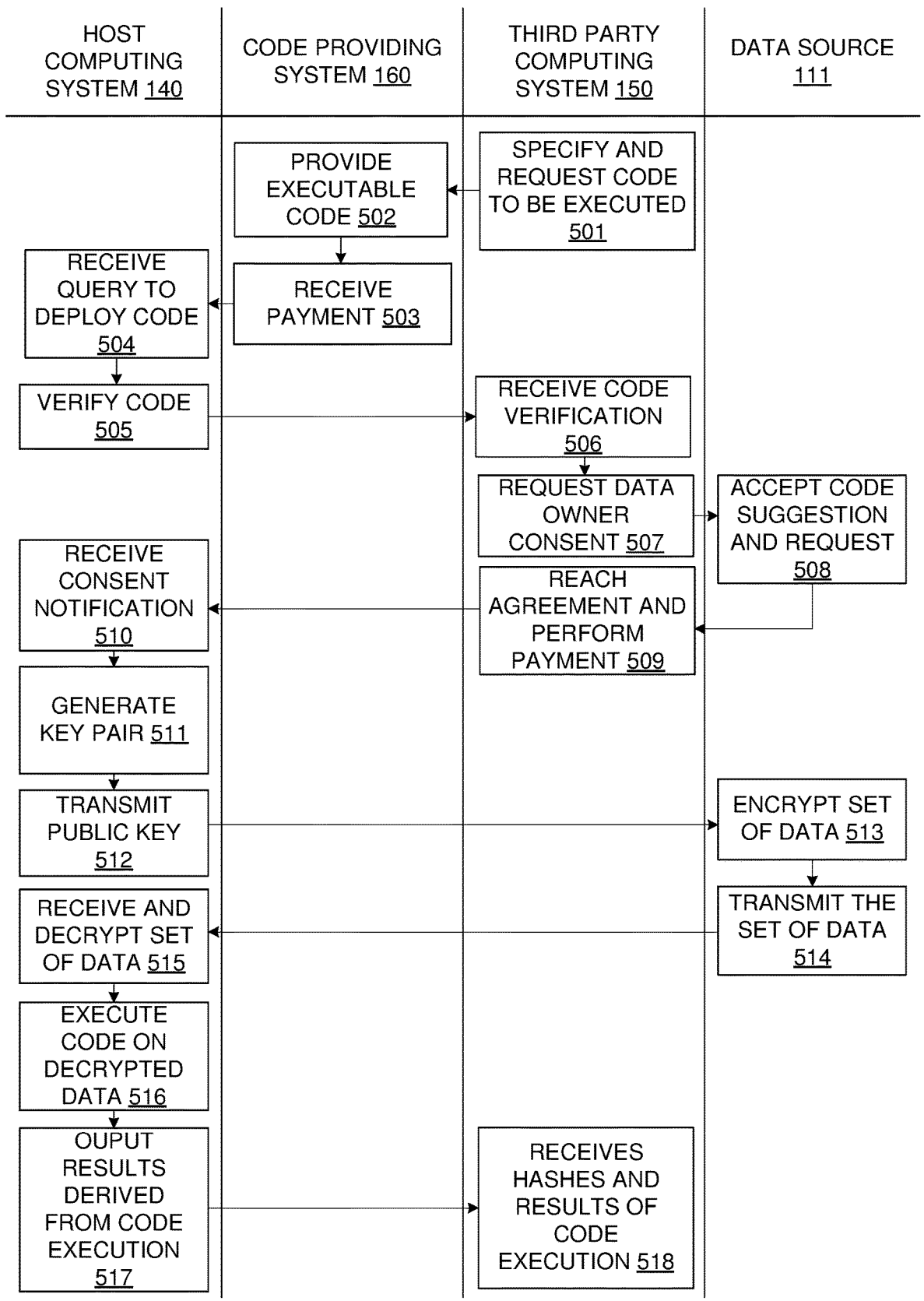
FIG. 5 is a swim-lane diagram which illustrates an example method for protecting data in a data sharing system according to aspects of the present disclosure.

An exemplary method for protecting privacy in a data sharing system is illustrated in the swim-lane diagram of FIG. 5, in which respective swim-lanes delineate steps, operations or procedures performed by respective entities or devices.

Data sources may create their own sets of data and a wallet or alternative method that can hold tokens issued on a blockchain or similar distributed ledger technology. Code providers may develop code and register their code with a code repository and add a hash of code to a license, for example, as a smart contract, associated with the respective code provider on the blockchain owned by the code provider. When code providers can register their code on a smart contract, they own it. This means they can grant usage right to third parties and be compensated for it. All payments made by third parties to any code providers or data sources may, for example, be managed through the blockchain, although other means of payment are certainly included in the scope of this disclosure. Data sources may write a contract with a third-party so as to provide access to the sets of data of the data sources so that the code created by the code provider may be executed on the sets of data. The blockchain may facilitate and manage the contracting process and automate it for the most part.

A third-party participating in the network may specify code they want to execute on a set of data of a data source and request (501) the code from a code provider. The code may be provided (502) by the code provider in response to the code request (501) from the third-party. The code provider may receive (503) payment for the use of the code from the third-party, which code will have been registered by the code provider in a code repository associated with the blockchain. The code repository interfaces with the blockchain to store a hash of the source code. It should be appreciated that in an alternative embodiment the third-party may be a code provider itself, and the smart contract associated with the code provider may therefore be a smart contract associated with the third-party.

The host may receive a query (504) to deploy the code which the third-party wishes to execute on the set of data of the data source. The blockchain and code repository may be notified of the request and in response to receiving payment provide code and the code hash to the host. The host may verify (505) that the code is previously agreed on code registered within the code repository. If the code is verified, the host may transmit a code verification to the third-party.

In an exemplary protocol, in response to receiving (506) a code verification, the third-party may suggest the code which they want to execute on the set of data of the data source to the data source and request (507) the consent of the data source for the host to execute the suggested code on the data source's set of data. In response to receiving the consent request including the suggestion of code which the third-party wants to execute on the set of data, the data source may either accept (508), and therefore consent to, or reject (not shown) the request. If the request is accepted (508) by the data source, an agreement is reached (509) between the parties and the data source may record the hash of the code in a smart contract on the blockchain which is associated with the data source. Once an agreement has been reached, the third-party may pay the data source, the code provider and the host. Completing an agreement may include writing a smart contract providing consent to the third-party to execute code on the set of data of the data source. This may include providing access to the hashes of the private data of the data source.

As previously mentioned, only previously agreed on code may be executed on the set of data of the data source. Therefore, if the data source has not consented to the code being executed on the set of data, the host may not be able to verify the code. The process of verifying that the code is previously agreed on code may include the host determining whether the hash of the code registered in the code repository and added to the smart contract associated with the code provider compares to the hash of the code in the smart contract associated with the data source. If the hashes match, the code may be considered as agreed upon code.

The host may be notified (510) when an agreement has been reached between the data source and third-party. The notification may either be transmitted to the host by the data source, the third-party or via an instruction on the blockchain. The notification may be a data access consent notification providing access to the set of data from the data source to the host. In response to receiving (510) the consent notification, the host may generate (511) a public-private key-pair and transmit (512) the public key to the data source. The data source may receive the public key and encrypt (513) the set of data, including at least one true data element and at least one spurious element, with the public key. The at least one true element in the set of data may be any data element which the data source wishes to protect or keep private, for example the true value of assets, and the at least one spurious element may be any variations of data elements similar to the true data elements, for example a collection of similar but false values of the same asset. For example, if the set of data contains information regarding the value of an asset having a market value of V, then the data source may provide two spurious data element values of V+Δ and V−Δ. Once the set of data is encrypted the data source may provide access to the data to the host. The data source may transmit (514) the set of data, including various true elements and spurious elements, encrypted with the host's public key to the host so as to provide the host with access to the set of data including the at least one a true element and at least one spurious element. The host may receive and decrypt (515) the private data with the private key. The decrypted private data may then be stored on a database associated with the host. It should, however, be noted that the disclosures presented herein do no necessitate the use of encryption of data transmitted between the data source and host. The actual encryption mechanisms used can therefore be immaterial. The mere fact that the set of data includes real as well as spurious data elements and the host is not able to differentiate between these elements, implies that the data transmitted from the data source to the host already enjoys some form of protection. It is therefore conceivable that data sources may transmit data to hosts without encryption.

The host may access the code in the code repository which is executable on the set of data and execute (516) the code on the decrypted set of data stored by the host. The executable code may be code provided to the host by the code provider on behalf of the third-party. The executable code may be any code previously approved by the data source to be executed on a set of data associated with the data source. The code may be stored in the code repository to which the host has access. Even though the host may have the set of data of the data source in its possession, the true data which the data source wishes to protect is still unknown to the host as the set of data contains both true and spurious data elements.

Executing the code on the set of data may generate a result derived from the set of data at the host. The host may output (517) the results derived from executing the code on the set of data. Outputting (517) the results derived from executing the code on the set of data may include the host transmitting the result to the third-party. The result may include results derived from the at least one true element and the at least one spurious element. The results may therefore include the return of the code execution on the permutations of the set of data and the hash of each data entry in the set of data, i.e. each true element and each spurious element. Hashes may be used as they are easy to compute and do not substantially add to the computing requirements of the host. Therefore, each host can be said to return a tuple to the third-party:

$$\{[f_m(\omega) \forall \omega \in \Omega; H(x_i^{(k)}) \forall x_i^{(k)} \in \omega] \forall \omega \in \Omega\}$$

where $f_m$ is a version of the code applied to the set of data, $\Omega$ is all possible permutations of the set of data, $\omega$ is one possible permutation of the set of data, and $x_i^{(k)}$ is one of the data provided by the data source. The third-party may already have access to the hash values of the private data of the data source due to the agreement being reached between the third-party and the data source. The third-party therefore receives (518) the results of the code execution on the complete set of data from the host. The results may therefore include execution of code on the true elements which may be provided by more than one data source, as well as spurious elements. The code execution result may further include a hash of each data entry in the set of data.

The third-party may compare the hashes it receives from the host with hashes it receives from the data source. The comparison may output various results as a result of the comparison of the hashes from which the party may choose. In order for the third-party to select the result containing the requested information, the third-party needs to identify which of the results output by the hosts have been computed as a result of executing the code on the true elements of the set of data, and which of the results output by the host have been computed as a result of executing the code on the at least one spurious element in the set of data. This may be a fairly easy process for the third-party, as the third-party may already have access to the hashes of the true elements in the set of data, which it may have received directly from the data sources as part of the negotiation process.

Figure 6:
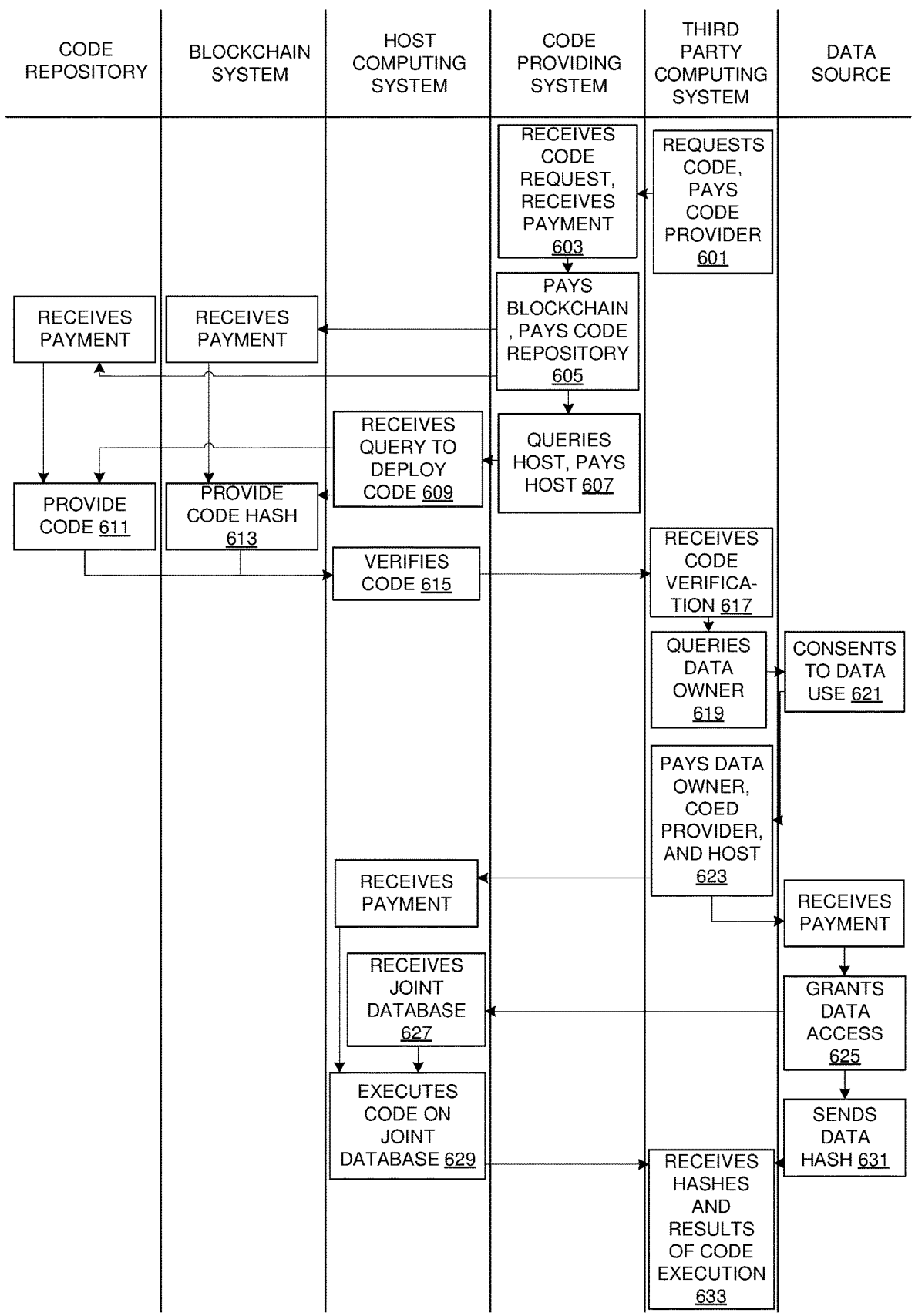
FIG. 6 is a swim-lane diagram which illustrates an example implementation of a method for protecting data privacy in a data sharing system according to aspects of the present disclosure; and, FIG. 7 is a block diagram which illustrates exemplary components of a computing device associated with a host according to aspects of the present disclosure.

FIG. 6 illustrates a detailed swim-lane diagram of an exemplary embodiment (600) of the method according to aspects of the present disclosure. In an initial step a third-party requests (601) code from a code provider. The code request is accompanied by a payment for the requested code. For the purposes of the exemplary embodiment it may be assumed that the code requested by the third-party is previously agreed upon code. The code provider receives the code request (603) together with the payment therefore. In response to receiving both the code request and payment therefore, the code provider pays a blockchain and a code repository (605). The code provider pays the code repository in order to store the code of the code provider and associated costs for using the blockchain or distributed ledger technology are paid to manage and facilitate a contracting process. The code provider then transmits (607) a query to a host and pays the host to deploy the code requested by the third-party. Once the host has received (609) the query and the payment, the code repository provides (611) access to the code to the host and the blockchain provides (613) access to the hash of the requested code. The host then computes a hash of the obtained code and compares it to the hash on the blockchain in the smart contract of the code provider. The hosts also use the computed hash to check within the data source's smart contract whether the data source has agreed to this code being used with the data source's data. If the compared hashes match, the host verifies (615) the code is previously agreed on code.

Once the code is verified the host transmits a code verification to the third-party. The third-party receives (617) the code verification and transmits (619) a query to a data source to execute code on a set of data of the data source. It should be appreciated though that the third-party does not need to wait for the code verification. The host will make sure that the third-party has paid everybody, that the code is verified and that the data source consented to the execution of this code on her data. Thus, the third-party only needs to buy permission to data given a particular piece of code. The query to the data source includes proof that the code has been verified by the host. The set of data on which the third-party wishes to execute the code includes true data elements and various spurious data elements. The various spurious data elements are added to the set of data by the data source, so as to obfuscate the true data elements. If the data source consents (621) to the use of her set of data to execute code thereon, the third-party pays (623) the data source, the host and the code provider. It should be noted that third parties may pay the code provider and the data source whenever they purchase permission to use their properties (code or data). However, the third-party may only pay the hosts after the execution of the code. As noted before, this may be done to incentivize good behaviour on the part of the host. Once the data source has received the payment from the third-party, the data source grants (625) access to the set of data, including the true data elements and various spurious data elements, to the host. Granting (625) access to the data source's data includes registering the third-party's address within a smart contract associated with that data. The host will check whether the third-party is registered before pulling that data.

The host receives (627) a joint database including the set of data. As mentioned above, the set of data includes the true as well as spurious data elements so as to obfuscate the true data elements from the host. The host therefore does not know which data in the data set is true, and which is spurious.

Once the host has received the payment from the third-party and the joint database from a database host, the host executes (629) the verified code on the joint database. Executing (629) the code on the joint database outputs a result at a computing device of the host which the host transmits to the third-party. The result transmitted to the third-party includes the hashes of the set of data and the result of the code execution on the set of data in the joint database. The third-party receives (633) the result including the hashes of the set of data and the result of the code execution on the set of data in the joint database from the host and also the hashes of the data source's data which is (or was previously) sent (631) to the third-party by the data source. Once the third-party has determined the true results, the third-party outputs it. Outputting the results may include the third-party outputting the results on a display of a computing device associated with the third-party, writing it to a desired storage location or any other suitable form of output. The desired output is determined at the computing device of the third-party by comparing the hashes received with the results of the code execution. It should be appreciated that, once the true results could be identified by the third-party, hosts identified as being honest may be paid.

Based on the above description it should be appreciated that a system according to the disclosure may include one or more of the following main components. A number of host nodes may be used who store a joint database of private data. A secret sharing mechanism may be provided between data sources and third parties; between data sources and hosts; and among data sources themselves. A consensus protocol may be used to determine truthful code execution by the hosts. A blockchain may be used that connects third parties, data sources, and hosts; and manages how third parties pay data sources and hosts.

The method and system as described herein may find application in any network in which data sources may wish to provide access to their private data to third parties without surrendering ownership of the private data. By enabling data sources to ensure that only pre-authorised code is executed on their private data, data sources may prevent third parties access to data which they wish to keep secret. The problem of privacy may be trivial to solve by providing data sources with the ability to ensure that only authorised code is executed on their private data without revealing the exact data the data source wishes to keep secret. The most apparent applications of the system and method as described herein may be one or more of the medical sector, cyber security and military applications and the financial sector. Exemplary embodiments of some of the above mentioned applications are discussed in more detail below.

The popularity of blockchain technology has brought forth multiple projects that aim to create a distributed collection of medical records for each individual that may be accessed from virtually anywhere in the world, for example Medicalchain or Doc.ai. Since medical data is highly sensitive, it can be appreciated that the data needs to be encrypted, at least on a personal level if not even more broadly. Due to the inefficiency of most known technologies to compute over encrypted data millions of data points are left useless, not only for medical research, but also for data driven diagnostics. Using the system and method as described above, physicians may for example create data that they sign over to their patients, to utilize efficiently in data marketplaces. However, with the patients' permission (or if required by law), they are still able to analyse this data by being allowed access thereto. The patients may for example provide access to the data to their treating physician for free, but researchers or other physicians may be required to pay for access to the data. The system and method may foster medical research and lead to fast advancements due to its possibility to compute over highly accurate and granular data. The viability of the code needs to be assessed in order to ensure the accuracy of research results that could otherwise lead to harmful conclusions.

Cyber security and military applications may not only be relevant to security-concerned institutions such as the military or intelligence agencies, but also to government facilities that need to make sure the software they execute behaves as expected and does not enable security breaches or contain malicious fragments. A code repository which ensures that only approved code may be executed on data may enable such agencies to better control the code they execute on their servers, in particular for cloud applications.

In contrast to the prevailing ideology in the blockchain community, not all transactions between two participants in the blockchain can or should be visible to the public. Even though there are blockchain protocols, such as Quorum and Parity, that allow for "private" transactions, these protocols may not necessarily satisfy the privacy needs of the participants, such as individuals or corporations, as they only encrypt the transaction content while still disclosing the transacting participants. The transactions can therefore never be said to be fully private.

The current business model on the web is focussed on user data. Even though methods described herein may return data ownership to the user, it should be appreciated that services, such as search engines, social media platforms, and other digital platforms will not necessarily disappear. Machine learning algorithms may be registered and trained by using the data of each data source and thereby still provide a use for such services. Some of the data sources may even contribute their data for free in exchange for a better service product. The method and system as described herein may differ from existing blockchain solutions and other distributed systems in that its functionality is well beyond what existing blockchain solution can provide as it allows data sources to contract with third parties about the use of previously agreed upon code only.

Figure 7:
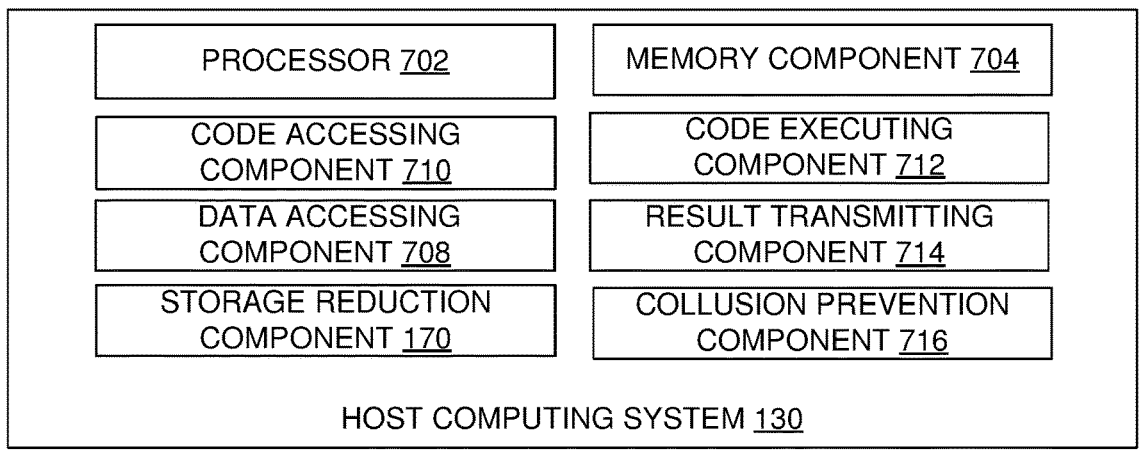

FIG. 7 is a block diagram which illustrates exemplary components which may be provided by a host computing system (130) that may be formed of one or more host nodes (131-134) according to the disclosure. The term computing system is intended to cover a single processing device or multiple processing devices, such as distributed devices. The computing system of each node may include a processor (702) for executing the functions of components described herein, which may be provided by hardware or by software units executing on the computing system. The software units may be stored in a memory component (704) and instructions may be provided to the processor (702) to carry out the functionality of the described components.

In order to execute non-separable code, private data accessed by the host computing system (140) is stored in a joint database where each host node has access to a complete copy of the entire database as a joint dataset. Each host node may run a possibly different version of the code. In one embodiment, at least three host nodes are required to provide a consensus protocol as a fault tolerance protocol.

The host computer system (130) may include a data accessing component (708). The data accessing component (708) may be arranged to access a set of data including the at least one true element and at least one spurious element. The set of data may be associated with data sources participating in the network. The set of data may be accessed in response to the host receiving a data access consent notification. The host may be provided access to the set of data only with the consent of the data owner. The data source may transmit the set of data to the host and the host may store the data in a joint database accessible by multiple host nodes (131-134).

The system may include a code accessing component (710) arranged to access code which is executable on the set of data so as to output a result derived from the set of data. The code accessing component may enable the host to deploy a code to be executed on the set of data of data sources. The code may be any code which has been registered with a code repository. The code to be executed on the set of data is previously agreed on code that may be verified by comparing its hash to that recorded in a smart contract associated with the data source.

The system may further include a code executing component (712) arranged to execute code on the set of data of the one or more data sources. The set of data may include at least one true data element as well as at least one spurious data element for each individual data source. The data source may provide access to the data by transmitting a randomized dataset to the host. The set of data may be encrypted with a public key associated with the host. The public key may be transmitted to, or otherwise obtained by the data source in response to an agreement, in which the data source consents to the execution of code on the set of data on the behalf of the third-party, between the third-party and the data source. The host may generate a public-private key pair and transmit the public key to the data source to encrypt the data. Whenever an entity becomes a host, it may have to generate such a key pair and may only have to do so once. The data source may transmit the data to the host as agreed with the third-party. The host may decrypt the data using its own private key. The code executing component (712) may further be arranged to execute the code on the set of data in order to generate a result. The result may include two components, the first one being the computational output on at least all true and spurious data, respectively (in other words two outputs), and the second being the collections of hashes of each individual datum within each set of data used for computation (at least all true and spurious data). The system may include a result transmitting component (714) arranged to output the result derived from executing the code on the set of data to the third-party.

The host computing system (130) may include a storage reduction component (170) for reducing storage requirements of the set of data at the host computing system (130) by applying a secure multiparty computation using secret shares from the multiple data sources.

The host computing system (130) may include a collusion prevention component (716) for preventing collusion by means of a tumbling mechanism that obfuscates which host node has computed which result.

Figure 8:
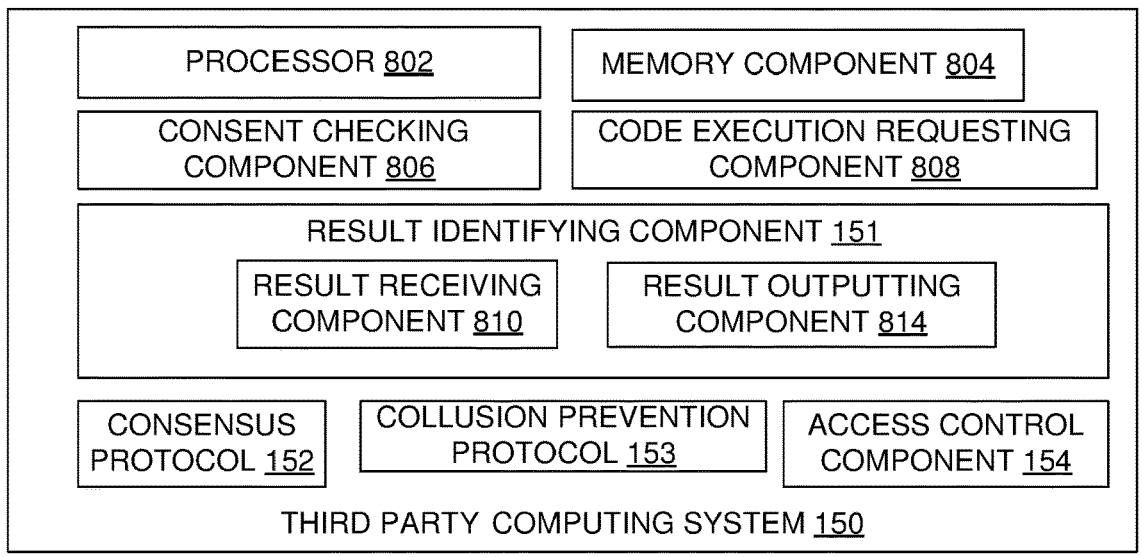
FIG. 8 is a block diagram which illustrates exemplary components of a computing device associated with a third-party according to aspects of the present disclosure.

FIG. 8 is a block diagram which illustrates exemplary components which may be provided by a third-party computing system (150). The computing system may include a processor (802) for executing the functions of components described below, which may be provided by hardware or by software units executing on the computing device. The software units may be stored in a memory component (804) and instructions may be provided to the processor (802) to carry out the functionality of the described components.

The system may include a consent checking component (806) arranged to check consent from a data source for execution of code, for outputting a result derived from data, on the data source's data. Checking consent for code execution on the set of data of the data source may include the third-party transmitting a request to the data source in which the third-party requests consent from the data source to execute code on the set of data of the data source. The data source may consent to the request by accepting the request and transmitting a consent notification to the third-party. The third-party may receive the consent notification from the data source indicating that the data source has provided consent for the execution of code on the data source's data. Receiving consent for the execution of code on the set of data of the data source may include registering the third-party within a smart contract controlled by the data source by using the third-party's address or any other suitable identifier. The smart contract may be associated with and controlled by the data source.

The system may include a code execution requesting component (808) arranged to request at least one host to execute the code on the data source's data. The data may include a true element and at least one spurious element. The host may, in response to receiving the request, determine whether the requested code has been previously agreed on, and if the code has been previously agreed on and consent from the data source to execute code on the set of data has been obtained, execute the code on the set of data.

The system may include a result identifying component (151) as described in FIG. 1A including a result receiving component (810) arranged to receive results of the code execution on the data source's data from the at least one host. The results received from the at least one host may include two results of which the first result may be the result of the code execution on both of the true element and the at least one spurious element in the set of data and the second result may be the hash of each element in the set of data of the data source. The result identifying component (151) may be arranged to identify which of the results received from the at least one host were computed on the true element. Identifying which results received by the at least one host were computed on the true element may include the third-party comparing the hashed data received from the at least one host with hashes of the set of data of the data source. The hashes of the data source's data may be the hashes of the true elements in the set of data. The data source may provide access to the hashes to the third-party in response to providing consent for the third-party to execute code on the data source's data. The hashes may be provided to the third-party by means of a smart contract recording the hashes of the true elements in response to an agreement between the third-party and the data source. The blockchain may facilitate and automate the contracting process for the most part. The result identifying component (151) may also include a result outputting component (814) arranged to output the generated results. The results may be output by displaying the results on a display of the computing system (150). The computing system (150) may be a communication device associated with the third-party.

The third-party computing system (150) may include a consensus protocol (152) to apply a consensus mechanism to report to the third-party the addresses of host nodes that have consistent outcomes of the code execution. The third-party computing system (150) may include a collusion prevention component (153) to prevent collusion between the third-party computing system (150) and the host computing system (140) by obfuscating which host node has computed which result; the third-party does not need to know the identity of the host.

The third-party computing system (150) may include an access control component (154) for verifying a smart contract between a data source and a third-party computing system to execute code on the set of data, wherein the data source records a hash of the code in a smart contract associated with the data source, and wherein the code is previously agreed on code if a hash of the executed code, which is stored in a smart contract associated with a code provider, matches the hash of the code stored in the smart contract associated with the data source.

It should be appreciated that the system may also include a space reducing component arranged to reduce the data storage space associated with the network. Even for a small amount of data sources and hosts participating in the system, the storage requirements may be a large. The system may therefore include such a space reducing component in order to increase the practicality and enable a large amount of data sources and hosts to participate in the network.

Figure 9:
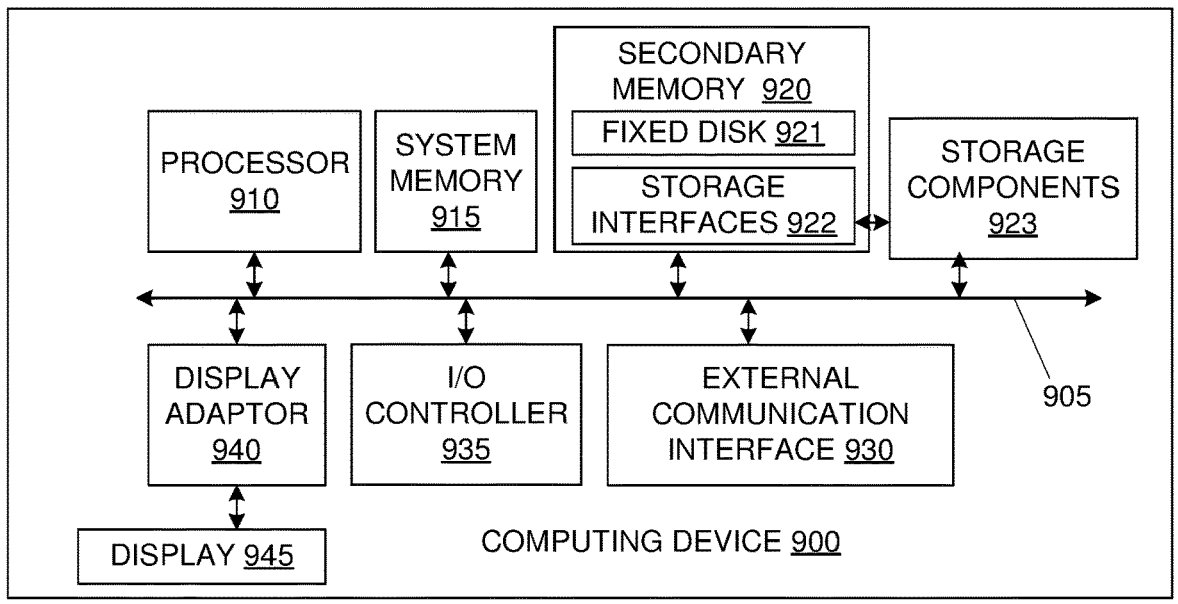
FIG. 9 illustrates an example of a computing device in which various aspects of the disclosure may be implemented.

FIG. 9 illustrates an example of a computing device (900) in which various aspects of the disclosure may be implemented. The computing device (900) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (900) may be suitable for storing and executing computer program code. The various participants and elements in the previously described system diagrams may use any suitable number of subsystems or components of the computing device (900) to facilitate the functions described herein. The computing device (900) may include subsystems or components interconnected via a communication infrastructure (905) (for example, a communications bus, a network, etc.). The computing device (900) may include one or more processors (910) and at least one memory component in the form of computer-readable media. The one or more processors (910) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (900) may be distributed over a number of physical locations (e.g. in a distributed, cluster or cloud-based computing configuration) and appropriate software units may be arranged to manage and/or process data on behalf of remote devices.

The memory components may include system memory (915), which may include read only memory (ROM) and random access memory (RAM). A basic input/output system (BIOS) may be stored in ROM. System software may be stored in the system memory (915) including operating system software. The memory components may also include secondary memory (920). The secondary memory (920) may include a fixed disk (921), such as a hard disk drive, and, optionally, one or more storage interfaces (922) for interfacing with storage components (923), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (900) may include an external communications interface (930) for operation of the computing device (900) in a networked environment enabling transfer of data between multiple computing devices (900) and/or the Internet. Data transferred via the external communications interface (930) may be in the form of signals, which may be electronic, electromagnetic, optical, radio, or other types of signal. The external communications interface (930) may enable communication of data between the computing device (900) and other computing devices including servers and external storage facilities. Web services may be accessible by and/or from the computing device (900) via the communications interface (930).

The external communications interface (930) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (930) may include a subscriber identity module (SIM) in the form of an integrated circuit that stores an international mobile subscriber identity and the related key used to identify and authenticate a subscriber using the computing device (900). One or more subscriber identity modules may be removable from or embedded in the computing device (900).

The computer-readable media in the form of the various memory components may provide storage of computer-executable instructions, data structures, program modules, software units and other data. A computer program product may be provided by a computer-readable medium having stored computer-readable program code executable by the central processor (910). A computer program product may be provided by a non-transient computer-readable medium, or may be provided via a signal or other transient means via the communications interface (930).

Interconnection via the communication infrastructure (905) allows the one or more processors (910) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (900) either directly or via an I/O controller (935). One or more displays (945) (which may be touch-sensitive displays) may be coupled to or integrally formed with the computing device (900) via a display (945) or video adapter (940).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Python, Java™, C++, C, Solidity, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof. The order of operations in the flow diagram may be varied where appropriate and some of the steps may be omitted in some embodiments.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims. Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method for processing anonymized data, carried out at a host computing system including multiple host nodes and comprising:
   accessing a set of data from multiple data sources each providing a randomized dataset including a true element and at least one spurious element, wherein the host computing system cannot differentiate between the elements so as to obfuscate the true element from the host computing system, wherein a true hash value of the true element is provided to a third-party computing system;
   wherein each of the host nodes has access to all possible permutations of the randomized datasets and includes compressing the permutations across the host nodes:
   accessing a code which is executable on the set of data so as to output multiple results for the elements of the set of data;
   processing the set of data, including for each element:
      executing the code on the element to generate a result;
      computing a hash value of the element; and
      outputting the result in association with the hash value to the third-party computing system,
   wherein the third-party computing system has access to the true hash value of the true element for identification of the result generated by execution of the code on the true element; and
   wherein the method includes the host computing system reducing storage requirements of the set of data by executing a number of identical protocol rounds including:
   creating a random ordering of at least two host nodes with sufficient computing and storing capacity to determine a database host node and at least one aggregator host node;
   receiving privately at the database host node randomized datasets from a prime number of data sources;
   the database host node computing all possible permutations of elements in the received datasets and computing a hash of each permutation and privately sending a hash of a permutation to each data source;
   receiving, at the aggregator host node, a summed multi-party secret from each data source computed amongst the multiple data sources of a secret of each data source in a finite field over the prime number of data sources together with a hash of the permutation of the data source; and
   the aggregator host node computing a sum of all the secret shares and storing the sum and the hash of the permutations and communicating a set of hashes of the permutations to the database host node to implement a compression factor as a cut-off to reduce storage requirements for any prime number of data sources.

2. The method as claimed in claim 1, wherein each host node processes the set of data by executing a different version of the code.

3. The method as claimed in claim 1, including preventing collusion between the third-party computing system and the host computing system by means of a tumbling mechanism that obfuscates which host node has computed which result.

4. The method as claimed in claim 1, including verifying a license between a data source and a third-party computing system to execute code on the set of data, wherein the data source records a hash of the code in a license associated with the data source, and wherein the code is previously agreed on code if a hash of the executed code, which is stored in a license associated with a code provider, matches the hash of the code stored in the license associated with the data source.

5. The method as claimed in claim 1, further comprising a method carried out at the third-party computing system including:
   receiving from the data source the true hash value of the true element;
   receiving from the host computing system the result of code executed on each of the elements of the set of data together with the hash value of each element; and
   identifying the result of the true element by matching the true hash value received from the data source to the hash value associated with results from the host computing system.

6. The method as claimed in claim 5, wherein the method carried out at the third-party computing system includes implementing a consensus protocol to verify that the host computing system has executed an agreed code by ensuring that a certain number of host nodes report a same hash of executed code.

7. The method as claimed in claim 5, wherein the method carried out at the third-party computing system includes:
   providing access to a true hash value of the true element only where consent to run code on the dataset of the data source is agreed.

8. The method as claimed in claim 1 and further comprising a method carried out at a data source including:
   providing a randomized dataset including a true element and at least one spurious element, wherein the spurious element cannot be distinguished from the true element by the host computing system so as to obfuscate the true element from the host computing system; and
   providing a hash value of the true element to the third-party computing system for later identification of a processed result of the true element.

9. A system for processing anonymized data comprising a host computing system including a processor and a memory configured to provide computer program instructions to the processor to execute functions of components:
   a data accessing component for accessing a set of data from multiple data sources each providing a randomized dataset including a true element and at least one spurious element, wherein the host computing system cannot differentiate between the elements so as to obfuscate the true element from the host computing system, wherein a true hash value of the true element is provided to a third-party computing system;
   a code accessing component for accessing a code which is executable on the set of data so as to output multiple results for the elements of the set of data;
   a code executing component for processing the set of data, including for each element:
      executing the code on the element to generate a result;
      computing a hash value of the element; and
      outputting the result in association with the hash value to the third-party computing system,
   wherein the third-party computing system has access to the true hash value of the true element for identification of the result generated by execution of the code on the true element; and
      a storage reduction component for compressing permutations across multiple host nodes included in the system, wherein each of the host nodes has access to all possible permutations of the randomized datasets, and wherein the storage reduction component is configured to reduce storage requirements of the set of data at the host computing system by executing a number of identical protocol rounds including:
   creating a random ordering of at least two host nodes with sufficient computing and storing capacity to determine a database host node and at least one aggregator host node;
   receiving privately at the database host node randomized datasets from a prime number of data sources;
   the database host node computing all possible permutations of elements in the received datasets and computing a hash of each permutation and privately sending a hash of a permutation to each data source;
   receiving, at the aggregator host node, a summed multi-party secret from each data source computed amongst the multiple data sources of a secret of each data source in a finite field over the prime number of data sources together with a hash of the permutation of the data source; and
   the aggregator host node computing a sum of all the secret shares and storing the sum and the hash of the permutations and communicating a set of hashes of the permutations to the database host node to implement a compression factor as a cut-off to reduce storage requirements for any prime number of data sources.

10. The system as claimed in claim 9, including a collusion prevention component for preventing collusion between the third-party computing system and the host computing system by means of a tumbling mechanism that obfuscates which host node has computed which result.

11. The system as claimed in claim 9, including an access control component for verifying a license between a data source and a third-party computing system to execute code on the set of data, wherein the data source records a hash of the code in a license associated with the data source, and wherein the code is previously agreed on code if a hash of the executed code, which is stored in a license associated with a code provider, matches the hash of the code stored in the license associated with the data source.

12. The system as claimed in claim 9, further comprising a third-party computing system including a processor and a memory configured to provide computer program instructions to the processor to execute functions of components:
   a hash receiving component for receiving from a data source a true hash value of the true element;
   a result receiving component for receiving from the host computing system a result of code executed on each of the elements of the set of data together with a hash value of each element; and
   a result identifying component for identifying the result of the true element by matching the hash values received from the data source to the hash value associated with results from the host computing system.

13. The system as claimed in claim 12, wherein the third-party computing system includes a consensus protocol component for implementing a consensus protocol to verify that the host computing system has computed an agreed code by ensuring that a certain number of host nodes report a same hash of executed code.

14. The system as claimed in claim 9, further comprising a data source including a processor and a memory configured to provide computer program instructions to the processor to execute functions of components:
   a dataset providing component for providing a randomized dataset including a true element and at least one spurious element, wherein the spurious element cannot be distinguished from the true element by the host computing system so as to obfuscate the true element from the host computing system; and a hash providing component for providing a hash value of the true element to the third-party computing system for later identification of a processed result of the true element.

* * * * *